US012570208B2

(12) United States Patent
Dong

(10) Patent No.: US 12,570,208 B2
(45) Date of Patent: Mar. 10, 2026

(54) MOUNTING KITS FOR AUXILIARY VEHICLE LIGHTS

(71) Applicant: Xin Dong, Bastrop, TX (US)

(72) Inventor: Xin Dong, Bastrop, TX (US)

( * ) Notice: Subject to any disclaimer, the term of this patent is extended or adjusted under 35 U.S.C. 154(b) by 0 days.

(21) Appl. No.: 18/882,111

(22) Filed: Sep. 11, 2024

(65) Prior Publication Data

US 2025/0083592 A1 Mar. 13, 2025

Related U.S. Application Data

(60) Provisional application No. 63/561,952, filed on Mar. 6, 2024, provisional application No. 63/537,821, filed on Sep. 11, 2023.

(51) Int. Cl.
B60Q 1/26 (2006.01)
B60Q 1/28 (2006.01)
B60Q 1/44 (2006.01)

(52) U.S. Cl.
CPC ............. B60Q 1/2615 (2013.01); B60Q 1/28 (2013.01); B60Q 1/44 (2013.01)

(58) Field of Classification Search
CPC ...... B60Q 1/2615; B60Q 1/2623; B60Q 1/28; B60Q 1/44; F21S 43/195

USPC ....... 362/368, 370, 371, 486, 549, 493, 495, 362/496
See application file for complete search history.

(56) References Cited

U.S. PATENT DOCUMENTS

| | | | | |
|---|---|---|---|---|
| 5,465,200 | A | * | 11/1995 | Finocchio .............. B60Q 1/263 362/480 |
| 7,220,032 | B2 | * | 5/2007 | Mori .................... B60Q 1/2626 296/180.1 |
| 2022/0111787 | A1 | * | 4/2022 | Pencak .............. B62D 33/0273 |
| 2024/0051483 | A1 | * | 2/2024 | Wu ......................... B60R 19/52 |

* cited by examiner

*Primary Examiner* — Thomas M Sember
(74) *Attorney, Agent, or Firm* — NZ Carr Law Office

(57) ABSTRACT

Embodiments of the present disclosure relate to vehicle mounting kits for installing a vehicle light without modifying the vehicle body. The mounting kit may include a front plate and one or more back members. The front plate may have a vehicle-specific profile, thereby, providing a vehicle-specific mounting solution for installers to effortlessly attach auxiliary vehicle lights, such as strobe lights, drive lights, signal lights, and work lights, without cutting or drilling into the vehicle body. Embodiments also provide a method of installing lights on a vehicle grille without grille removal, significantly cutting installation time and the risk of damaging factory parts.

20 Claims, 42 Drawing Sheets

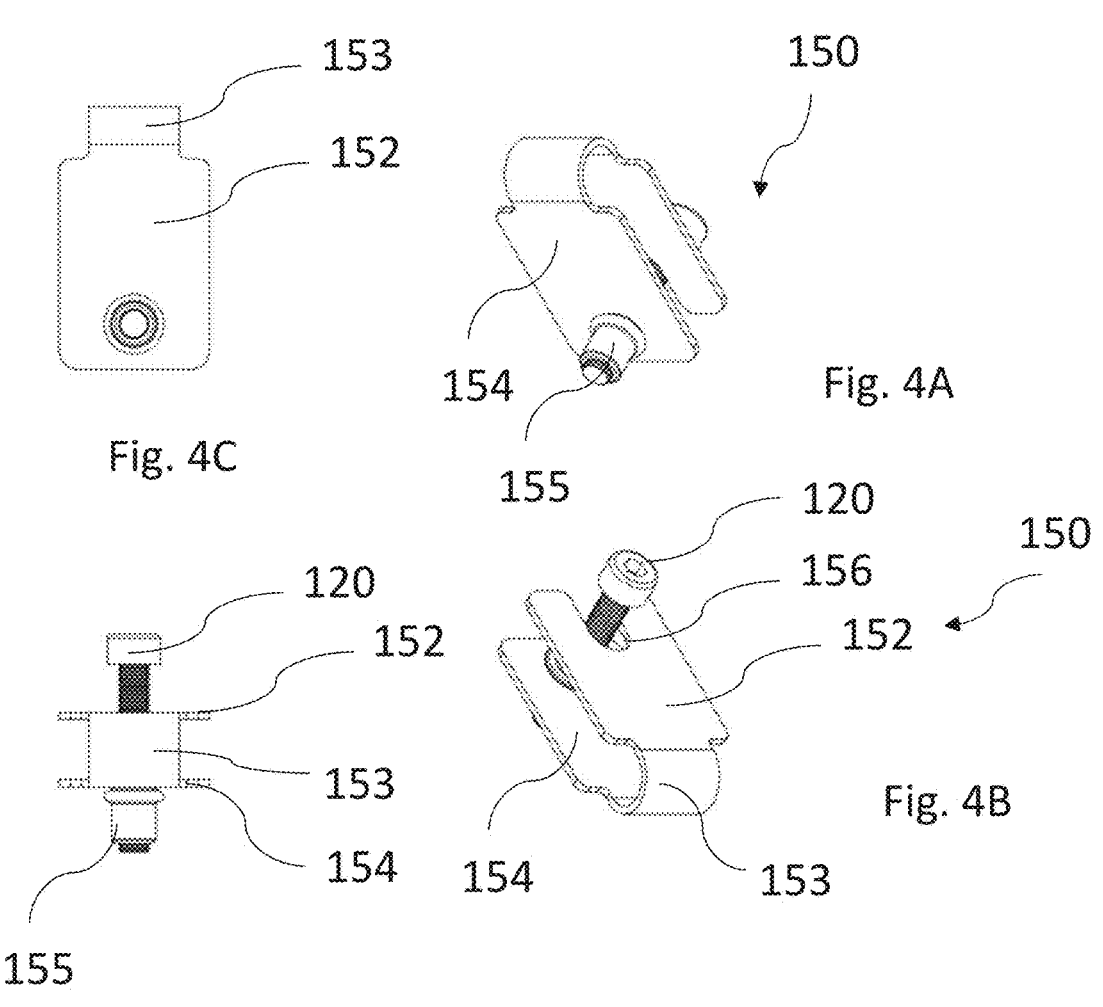
Fig. 4C
Fig. 4A
Fig. 4B
Fig. 4D
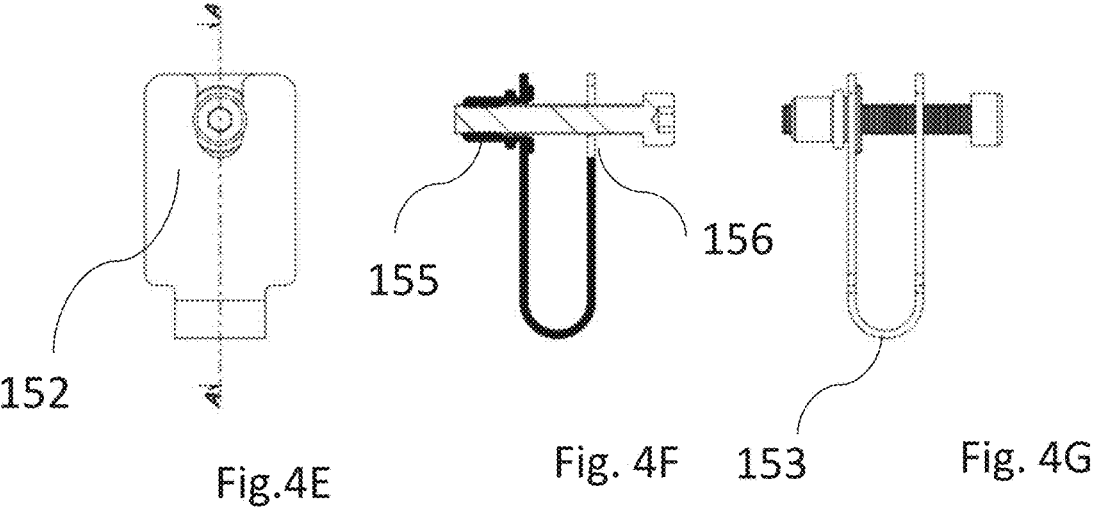
Fig.4E
Fig. 4F
Fig. 4G

100f

102f

110d

102f

105

120

104fc

102f

110d

105

110d

102f

104f

110d

104fp

110d

200c

210c

213c

214c

209c

207c

214c

205c 202c    208c

220

本田配三目灯

300a

300b

300c

310d

300d

302d

310d

302d

310d

MOUNTING KITS FOR AUXILIARY VEHICLE LIGHTS

CROSS-REFERENCE TO RELATED APPLICATIONS

This application claims priority to U.S. Provisional Application Ser. No. 63/537,821 filed Sep. 11, 2023, and 63/561, 952 filed on Mar. 6, 2024. Each of the aforementioned patent applications is incorporated by reference in its entirety.

FIELD

The present disclosure relates to brackets and frames for auxiliary vehicle lights. Particularly, embodiments of the present disclosure relate to brackets and frames for mounting auxiliary vehicle lights without modifications to the vehicle.

BACKGROUND

Motor vehicles contain numerous lighting devices for both interior and exterior illumination. Auxiliary vehicle lights, such as auxiliary driving lights, work lights, signal lights, beacon lights, or emergency lights, are sometimes installed on vehicles to suit particular needs. To install an auxiliary vehicle light, multiple parts of a vehicle must be disassembled and modified so that the auxiliary vehicle light may be secured, powered, and controlled. The process of installing auxiliary vehicle lights is a labor-intensive process, which requires both mechanical and electrical expertise, and resulting in permanent modifications to the vehicle.

Therefore, there is a need for apparatus and methods to install auxiliary vehicle lights.

SUMMARY

The present disclosure includes embodiments of brackets and frames for auxiliary vehicle lights. The brackets and frames are designed to secure auxiliary vehicle lights on a vehicle body without modification to the vehicle body.

BRIEF DESCRIPTION OF THE DRAWINGS

Embodiments of the present disclosure, briefly summarized above and discussed in greater detail below, can be understood by reference to the illustrative embodiments of the disclosure depicted in the appended drawings. It is to be noted, however, that the appended drawings illustrate only typical embodiments of this disclosure and are therefore not to be considered limiting of its scope, for the disclosure may admit to other equally effective embodiments.

FIGS. 4A-4G schematically demonstrate a back clip for according to embodiments of the present disclosure.

Figure 1A:
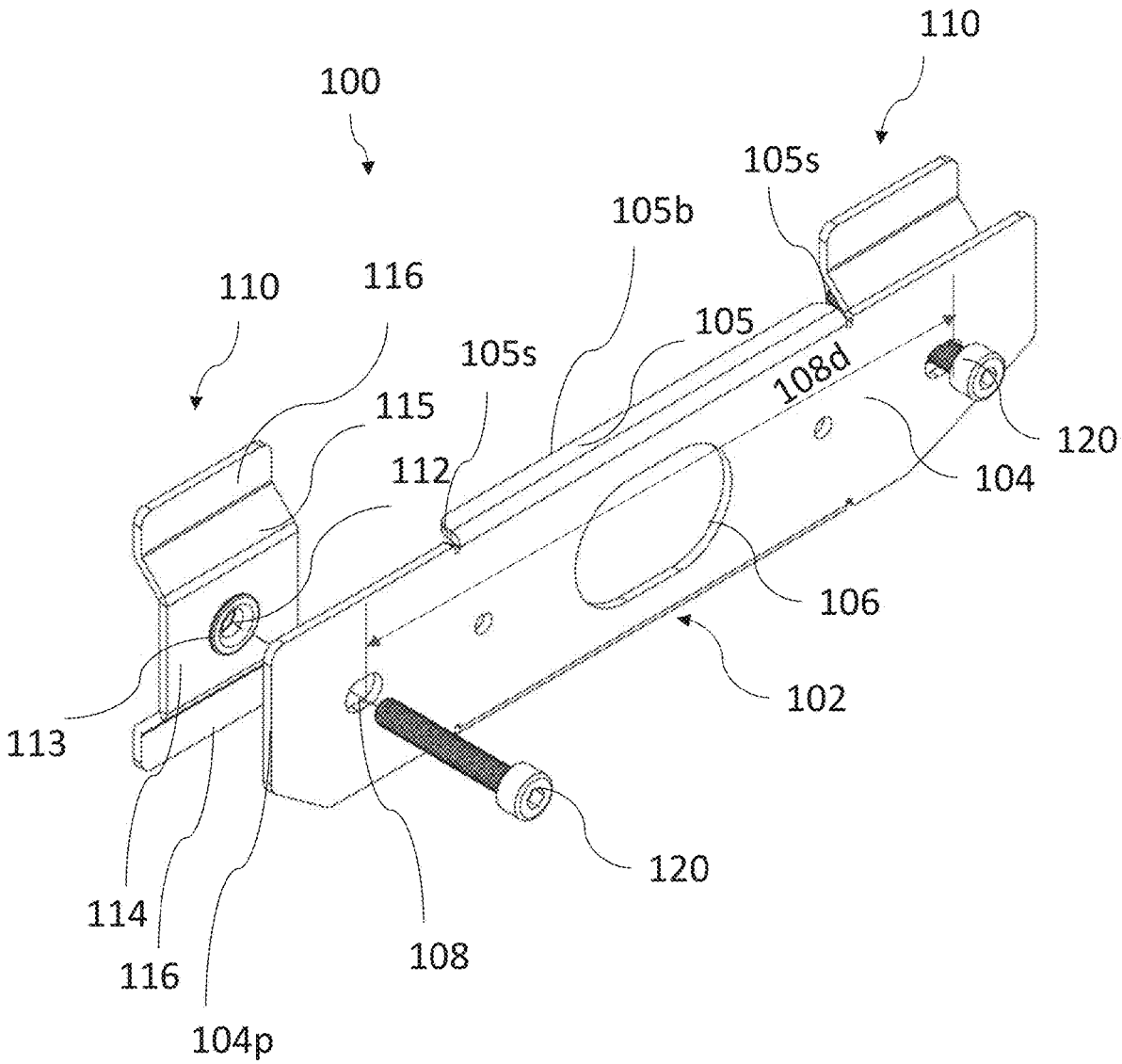
FIGS. 1A-1D schematically demonstrate a mounting kit according to the present disclosure.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present disclosure relate to brackets and frames for mounting an auxiliary vehicle light on a vehicle without modifying body structure of the vehicle. In some embodiments, a bracket assembly may be used to mount a vehicle light, such as a driving light or an emergency light, on a grille of a vehicle without modifying the grille and without removing the grille from the vehicle during installation. In some embodiments, the bracket assembly may include a front plate and one or more back plates. The front plate is configured to receive and secure a vehicle light thereon. In some embodiments, the front plate may be designed to fit an opening of a vehicle grille, such as a factory grille. The one or more back plates is configured to attach to the front plate with a portion of the grille secured in between. In some embodiments, a vehicle light may be secured to the front plate and the back plate using the same fastening elements. After installation, the vehicle light fits in the opening of the grille with the appearance of the original configuration.

Figure 1B:
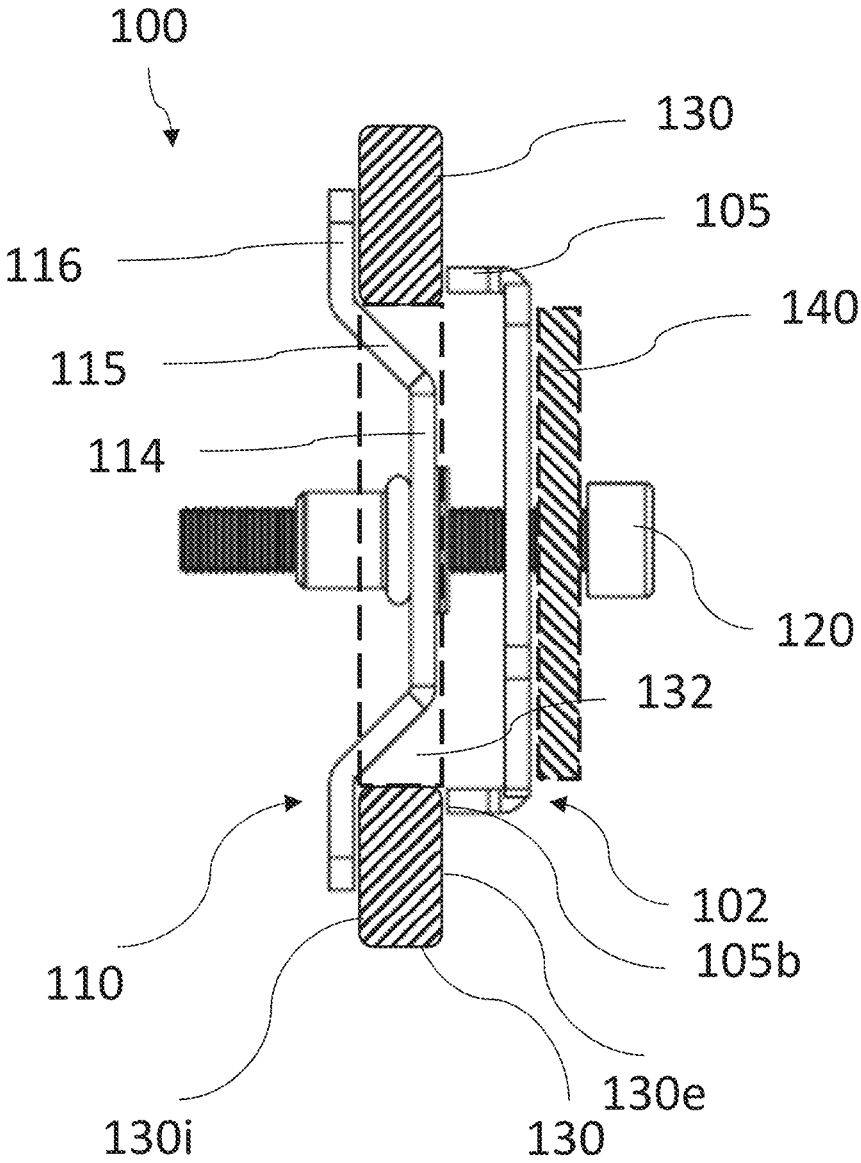
Figure 1C:
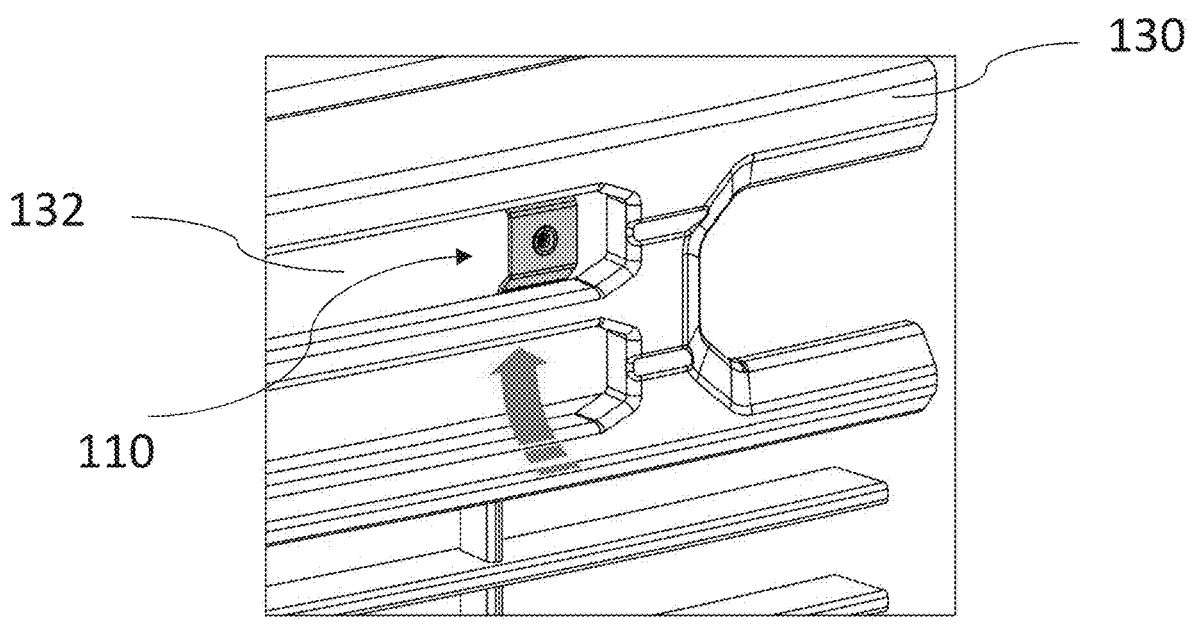
Figure 1D:
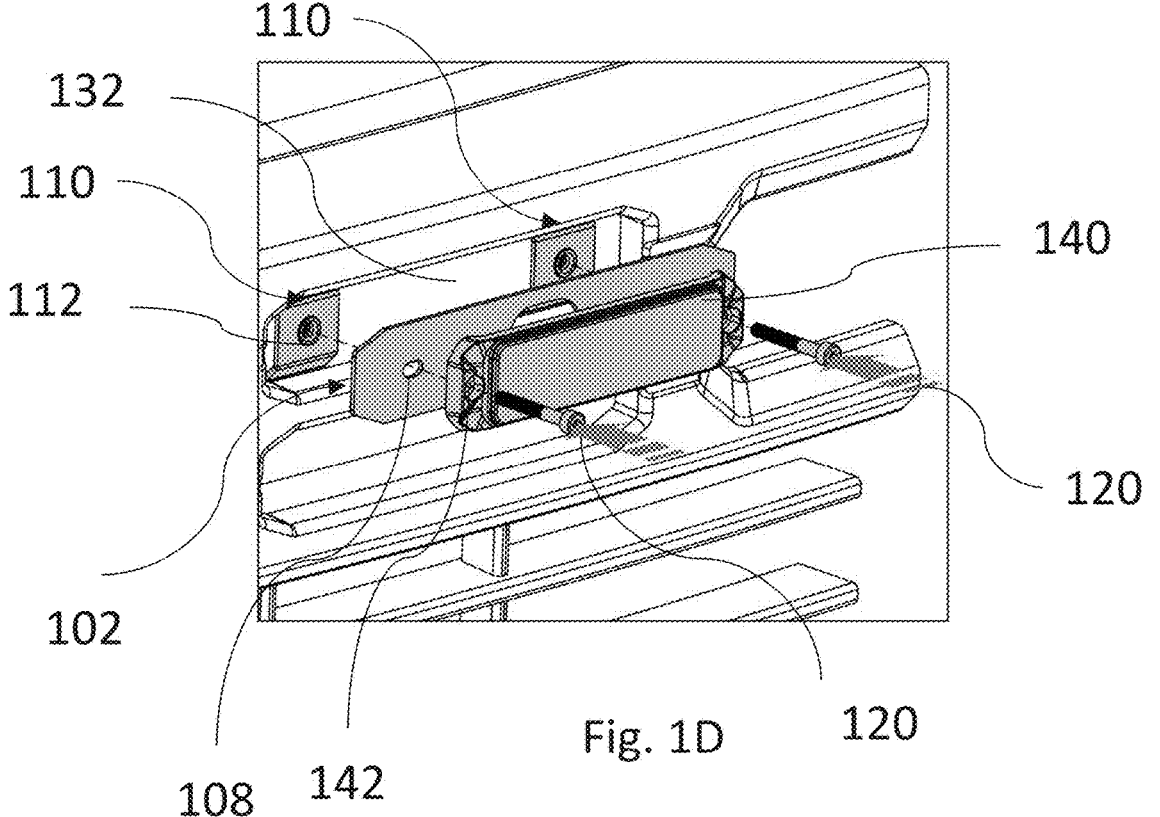

FIGS. 1A-1D schematically demonstrate a mounting kit 100 according to the present disclosure. FIG. 1A is a schematic exploded view of the mounting kit 100 according to one embodiment of the present disclosure. FIG. 1B is schematic sectional view of the mounting kit 100 in FIG. 1A. FIGS. 1C and 1D schematically illustrate intermediate steps of installing a vehicle light on a grille using the mounting kit 100.

The mounting kit 100 may include a front plate 102 and one or more back plates 110. The front plate 102 includes a body 104. The body 104 may be substantially planar. For example, the body 104 may be formed from a sheet metal. The shape of the body 104 may be customized according to the vehicle to be installed. In some embodiments, an outer profile 104p of the body 104 may have a shape to match a profile of an existing opening in a vehicle so that the body 104 would fit in the existing opening upon installation. For example, the outer profile 104p of the body 104 may be shaped to fit an opening in a vehicle grille.

In some embodiments, the body 104 may include one or more fastener openings 108 to receiving one or more fasteners, such as screws, there through. The one or more fastener openings 108 are configured to receive screws to fasten with one or more back plates 110.

In some embodiments, the one or more fastener openings 108 are also configured to secure a vehicle light, for example with the fasteners 120, or screws. As shown in 1A, the body 104 of the front plate 102 include two fastener openings 108 formed at a distance 108d apart from each other. The distance 108d may be selected to match a distance between mounting openings of a vehicle light. In situations when vehicle lights are modular lights, i.e. with modular mounting configurations, the distance 108*d* may be selected to match the mounting distance of the modular lights so that the mounting kit 100 may be used to mount a serious of modular lights.

In some embodiments, the front plate 102 includes a light connection opening 106 formed through the body 104. The light connection opening 106 is configured to provide a passage to power and control cords of the vehicle light installed on a front side of the front plate 102 to a back side to connect with a power supply and/or a control cord with the vehicle. In some embodiments, the light connection opening 106 may be disposed between the two fastener openings 108. In some embodiments, the light connection opening 106 may be a standard size to enable modular installation.

In some embodiments, the front plate 102 may include alignment tabs 105 on an upper edge and a lower edge of the body 104. The alignment tabs 105 may be positioned in a central portion of the body 104 and extend within a space between the fastener opening 108. The alignment tabs 105 may be bended towards a back side of the body 104 creating a shoulder 105*s* on each end of the alignment tabs 105. The shoulders 105*s* may be used to provide reference positions for the back plates 110 during installation. The alignment tab 105 includes a back edge 105*b* extending beyond the back surface of the body 104. When assembled, the back edge 105*b* may be in contact with a vehicle component.

The back plate 110 may be shaped to be positioned flashed against a vehicle component, for example flashed against a vehicle grille. The back plate 110 may be sized so that the back plate 110 may be inserted behind the grille through a grille opening, thereby, installing a vehicle light on the grille without removing the grille from the vehicle. The back plate 110 may be long enough to straddle over the grille opening. In some embodiments, the back plate 110 is small enough to pass through the vehicle opening for the vehicle light to be installed to go behind or inside the opening. In some embodiments, the back plate 110 includes structural features to "straddle" over an opening in the vehicle component, such as the vehicle grille. In some embodiment, the structural features may be shoulders. As shown the example of FIG. 1, the back plate 110 includes a central panel 114, two end panels 116, and two sloped shoulder panel 115 connecting the central panel 114 to the end panels 116. In some embodiments, the end panels 116 are substantially planar. The central panel 114 protrudes above the end panels 116 with the sloped shoulder panels 115 in between. In some embodiments, the end panels 116 may be designed to be positioned flash against the vehicle component, such as the grille while the central panel 114 is positioned in the vehicle opening, such as the grille opening. The shoulder panels 115 allow the back plate 110 to nest in the vehicle opening.

In some embodiments, a fastener opening 112 is formed through the back plate 110. The fastener opening 112 may be formed through the central panel 114 of the back plate 110. In some embodiments, the fastener opening 112 in the back plate 110 is threaded so that the back plate 110 may functions as a nut. In some embodiments, a threaded insert 113 is disposed in the fastener opening 112. The threaded insert 113 provide an extended threaded portion, thus, allowing a strong threaded connection. The fastener opening 112 is configured to align with one of the fastener openings 108 of the front plate 102 so that a fastener 120 may be used to form a threaded connection. When threaded with the back plate 110 or the threaded insert 113 of the back plate 110, the fastener 120 may secure the back plate 110 to the front plate 102 with a portion of the vehicle component, such as the grille, sandwiched in between. In some embodiments, the fastener 120 may be inserted through a mounting opening of the vehicle light to be installed and secure the vehicle light, the front plate 102, the back plate 110, and the vehicle at the same time.

As shown in FIG. 1B, which is a cross section of the mounting kit 100 after installation, a vehicle light 140 is installed in an opening 132 of a vehicle component 130 using the mounting kit 100. The back plate 110 is pressed against the vehicle component 130 on an interior side 130*i* across the grille opening 132. The front plate 102 is pressed against the vehicle component 130 on an exterior side 130*e*. In some embodiments, the alignment tabs 105 of the front plate 102 are in contact with the exterior side 130*e* of the vehicle component 130. The vehicle light 140 is disposed over the front plate 102. The vehicle light 140 has a mounting opening 142, shown in FIG. 1D. The exterior side 130*e* of the fastener 120 is inserted through the vehicle light 140 and the front plate 102 to make a threaded connection with the back plate 110. The front plate 102 and the back plate 110 are securely mounted on the vehicle component 130 by tightening the fastener 120. The vehicle light 140 is installed on the vehicle with the appearance of "plugged" into the opening 132. The end panels 116 of the back plate 110 are flashed against the interior side 130*i* of the vehicle component 130. The center panel 114 of the back plate 110 is disposed in the vehicle opening 132.

Because the fastener 120 passes through the grille opening 132 and makes connection with the back plate 110, the vehicle light 140 is mounted securely on the vehicle without drilling holes or making other modification to the vehicle. Furthermore, there is no need to remove the vehicle component 130 from the vehicle during installation. FIGS. 1C and 1D schematically illustrate a process of installing a vehicle light on an opening of a vehicle grille using the mounting kit 100.

As shown in FIG. 1C, the back plate 110 is inserted to the interior side of the vehicle grille 130 via the opening 132. The back plate 110 is then rotated to straddle the grille opening 132. In some embodiments, two back plates 110 may be placed in the grille opening 132. There is no need to remove the vehicle grille 130 from the vehicle.

In FIG. 1D, the front plate 102 is positioned on the exterior side of the vehicle grille 130 to cover the grille opening 132. The back plates 110 are aligned to with the fastener openings 108 of the front plate 102. The vehicle light 140 is placed over the front plate 102 with the mounting openings 142 aligning with the fastener openings 108 of the front plate 102. The fasteners 120 are then inserted through the mounting openings 142 and the fastener openings 108 to be threaded in the back plate 110. The vehicle light 140 may be mounted in the grille opening 132 by tightening the fasteners 120.

Even though a screw is shown as an example of the fastener 120 in the mounting kit 100, other suitable means may be used to form a secured connection between the back plate 110 and the front plate 102. For example, adhesive, bolt and nut assemblies, brackets, snaps, and the like may be used in place of a screw.

In some embodiments, the front plate 102 may be formed on the vehicle light 140 directly. In other embodiments, the vehicle light 140 may be attached to the front plate 102 by a separate means.

Figures 2A, 2B, 2C, 2D, 2E, 2F:
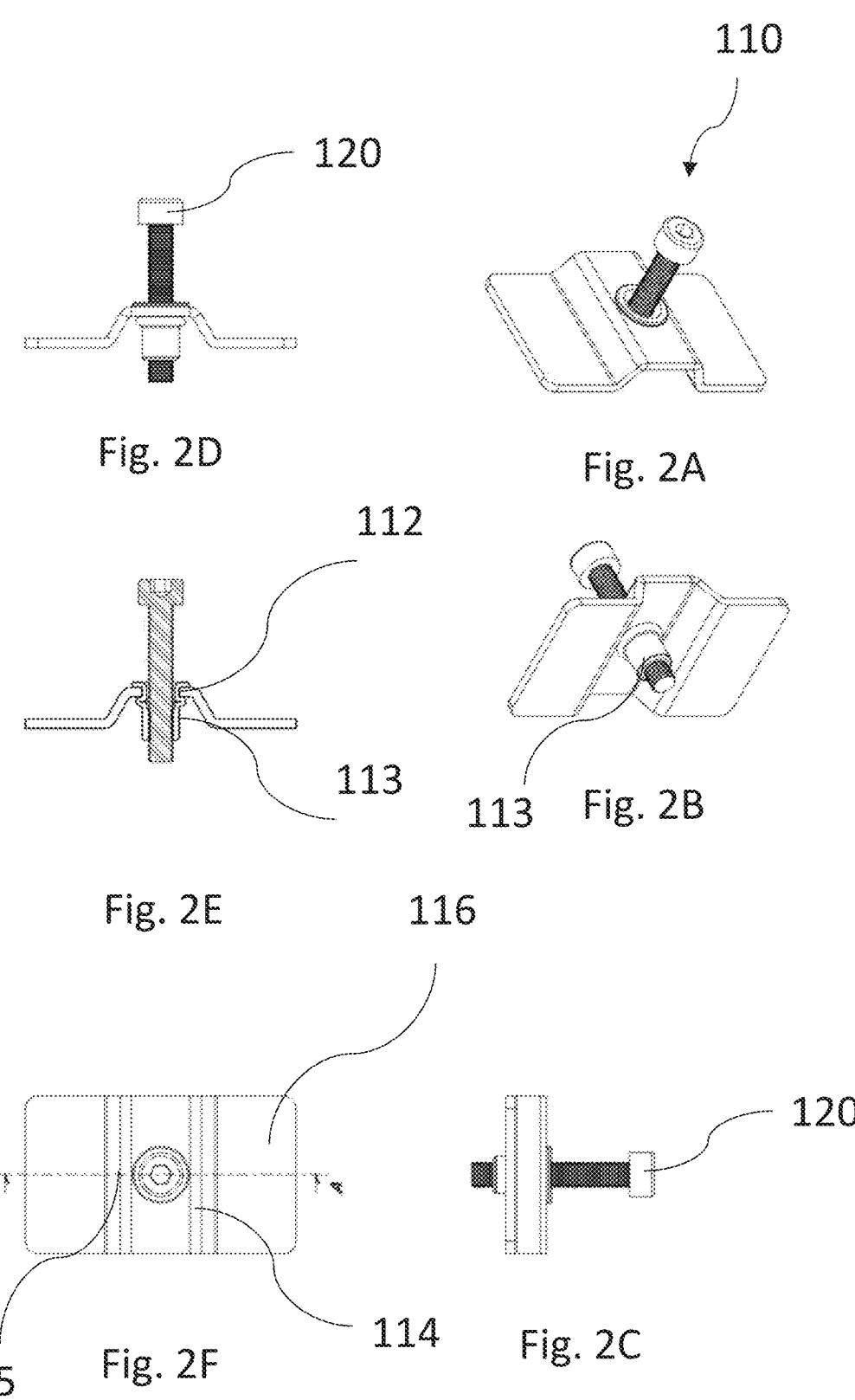
FIGS. 2A-2F schematically demonstrate a back plate for according to embodiments of the present disclosure.
Figures 3A, 3B, 3C, 3D, 3E, 3F:
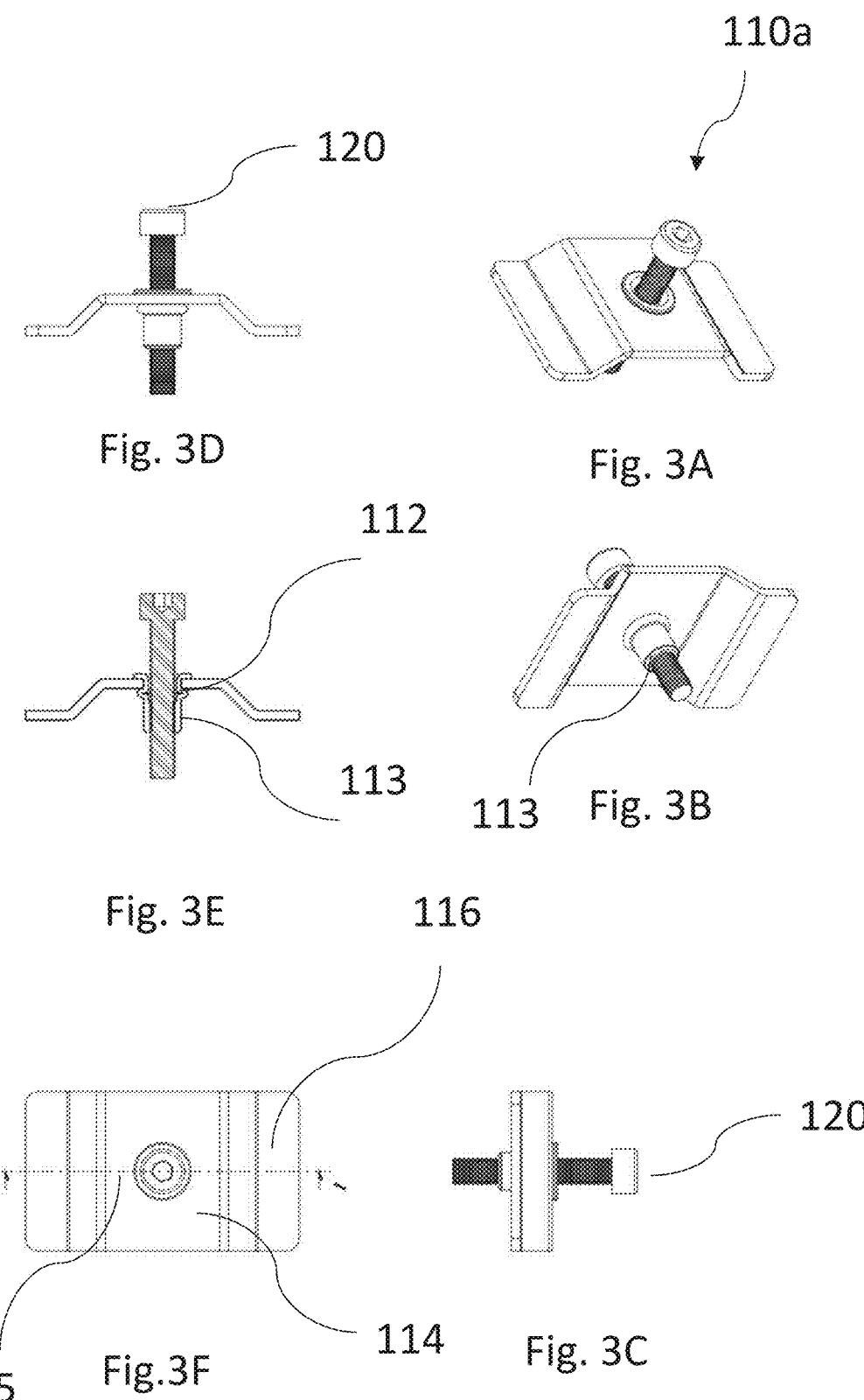
FIGS. 3A-3F schematically demonstrate a back plate for according to embodiments of the present disclosure.

FIGS. 2A-2F schematically demonstrate the back plate 110 and the fastener 120 according to embodiments of the present disclosure. FIGS. 2A and 2B are perspective views of the back plate 110 with the fastener 120 connected to the threaded insert 113. FIGS. 2C and 2D are side views of the back plate 110 and the fastener 120. FIG. 2E is a cross sectional view showing the threaded insert 113 disposed in the fastener opening 112. FIG. 2F is a top view of the back plate 110 and the fastener 120.

FIGS. 3A-3F are various views of a back plate 110a according to embodiments of the present disclosure. The back plate 110a is similar to the back plate 110 except that the back plate 110a has a wider central panel 114. The wider central panel 114 allows the back plate 110a to straddle across a wider vehicle opening.

FIGS. 4A-4G schematically demonstrate a back clip 150 according to embodiments of the present disclosure. The back clip 150 may replace the back plate 110 in the mounting kit 100. The back clip 150 may grab small structural features on a vehicle, such as a column in a vehicle grille, to make a secure mounting. FIGS. 4A and 4B are perspective views of the back clip 150. FIG. 4C is a bottom view of the back clip 150. FIG. 4D is a side view of the back clip 150. FIG. 4E is a top view of the back clip 150. FIG. 4F is a cross sectional view of the back clip 150. FIG. 4G is a side view of the back clip 150.

The back clip 150 may be shaped to be secured around a bar shaped feature on a vehicle component, for example, a column of a vehicle grille. The back clip 150 may be sized so that a portion of the back clip 150 may be placed behind the grille through a grille opening without removing the vehicle grill from the vehicle. In some embodiments, two back clips 150 may be placed around two columns on opposing ends of an elongated opening in a vehicle to hold a vehicle light in the elongated opening.

In some embodiments, the back clip 150 includes structural features to "grab" a structure adjacent an opening in the vehicle component, such as the vehicle grille. In some embodiment, the structural features may be a loop. As shown the example of FIGS. 4A-4F, the back clip 150 includes a front panel 152, a back panel 154, and a curved belt 153 connecting the front panel 152 and the back panel 154. The front panel 152 and the back panel 154 may be substantially parallel to each other while the curved belt 153 has a semicircle cross section. The front panel 152, the back panel 154, and the curved belt 153 form a flexible loop, which may be opened to receive a vehicle component therein. In some embodiments, the curved belt 153 is narrower in width than the front panel 152 and the back panel 154. The narrower width of the curved belt 153 provides structural flexibility for installation and positioning. In some embodiments, the back panel 154, the curved belt 153, and the front panel 152 may be formed from a single piece of sheet metal material.

In some embodiments, a fastener opening 156 is formed through the front panel 152 of the back clip 150. The fastener opening 156 may be an open ended notch. Alternatively, the fastener opening 156 may be a closed through hole. The through hole may be elongated to provide some installation flexibility. A threaded insert 155 is disposed through the back panel 154 of the back clip 150. The threaded insert 155 is aligned with the fastener opening 156 to allow the fastener 120 passing through the fastener opening 156 to make a threaded connection with the threaded insert 155. When threaded with the threaded insert 155 of the back panel 154, the fastener 120 may pressure the loop to close, thereby securing the back clip 150 around a vehicle component enveloped in the back clip 150.

Figures 5A, 5B:
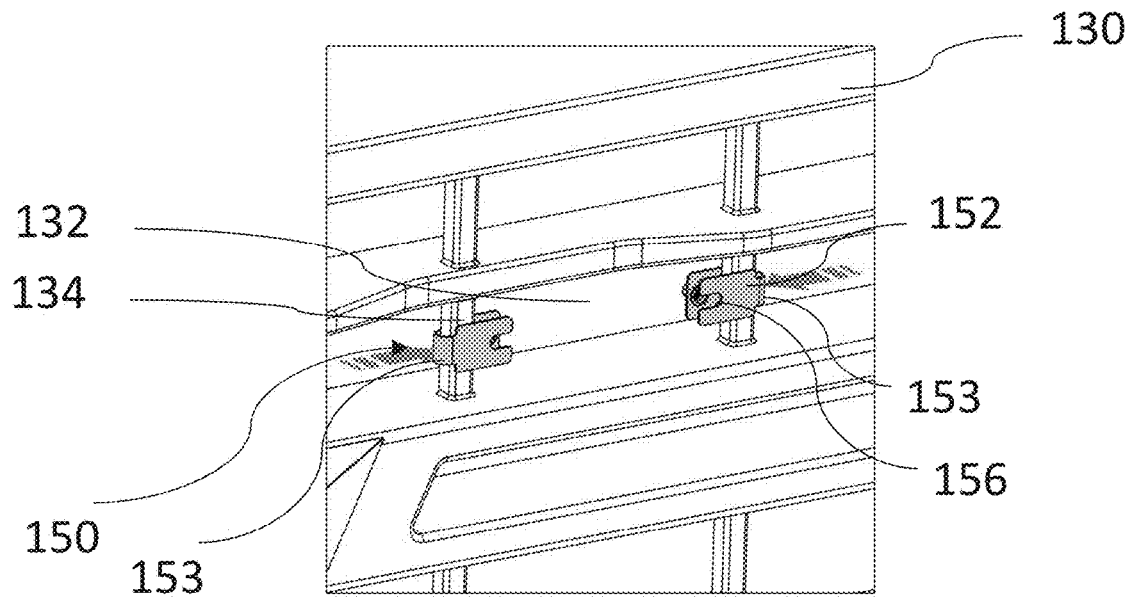
FIGS. 5A-5B schematically illustrate a process of installing a vehicle light using back clips according to embodiments of the present disclosure.

FIGS. 5A-5B schematically illustrate a process of installing a vehicle light using back clips 150 according to embodiments of the present disclosure. A vehicle light is to be installed in the opening 132 of the vehicle grille 130. The vehicle grille 130 includes two columns 134 on opposing ends. As shown in FIG. 5A, two back clips 150 are first placed around the columns 134. In some embodiments, the back clips 150 may be placed by first placing the back panel 154 behind the vehicle grille 130 from an exterior side of the opening 132, and pushing the back clip 150 towards the column 134 to "grab" the column 134. At this point, the front panel 152 is facing an exterior of the vehicle and the fastener opening 156 is positioned in the opening 132.

In FIG. 5B, the front plate 102 is positioned on the exterior side of the vehicle grille 130 to cover the grille opening 132. The back clips 150 may be adjusted to align the fastener openings 156 with the fastener openings 108 of the front plate 102. The vehicle light 140 is placed over the front plate 102 with the mounting openings 142 aligning with the fastener openings 108 of the front plate 102. The fasteners 120 are then inserted through the mounting openings 142 in the vehicle light 140, the fastener openings 108 of the front plate 102, and the fastener opening 156 of the front panel 152 of the back clip 150 to be threaded in the threaded insert 155 of the back panel 154 of the back clip 150. The vehicle light 140 may be mounted in the grille opening 132 by tightening the fasteners 120. During this installation process, the vehicle grille 130 remains installed on the vehicle. There is no need to remove the vehicle grille 130 from the vehicle.

It should be noted that the back clip 150 and the back plate 110 may be used interchangeably or in combination with the front plates according to embodiments of the present disclosure. The back plate 110 and the back clip 150 may be correctively referred as back members.

FIGS. 6-16 schematically illustrate various mounting kits 100a-100k for vehicle lights according to embodiments of the present disclosure. The mounting kits 100a-100k are variations of the mounting kit 100 discussed above. Each of the mounting kits 100a-100k includes various design features suitable for certain conditions. The design features in the mounting kits 100a-100k may be interchanged and combined according to structural features of the vehicle and the vehicle lights to be installed.

Figure 6:
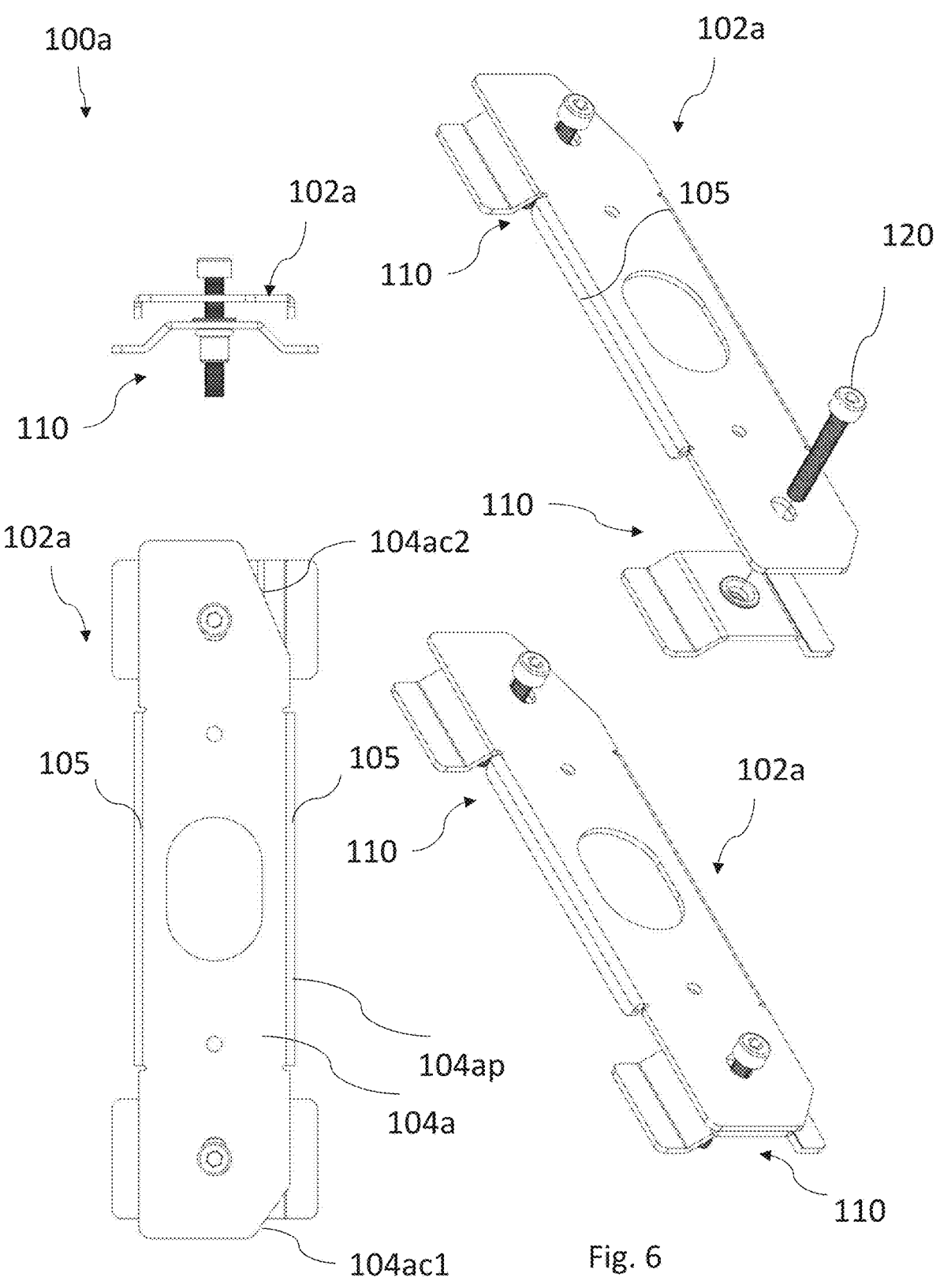
FIGS. 6-16 schematically illustrate various mounting kits for vehicle lights according to embodiments of the present disclosure.

FIG. 6 schematically includes various views of a mounting kit 100a according to the present disclosure. The mounting kit 100a is similar to the mounting kit 100 discussed above. The mounting kit 100a includes a front plate 102a and two back plates 110. The front plate 102a has a substantially planar body 104a with a profile 104ap shaped to match an exist opening in a vehicle. The profile 104ap may be substantially rectangular in shape with one or more chamfer edges 104ac1, 104ac2 at one or more corners. The chamfer edges 104ac1, 104ac2 may be formed to match the existing openings in which the vehicle lights are to be installed. In some embodiments, the chamfer edges 104ac1, 104ac2 may have different dimensions, resulting in a non-symmetrical body 104a.

Figure 7:
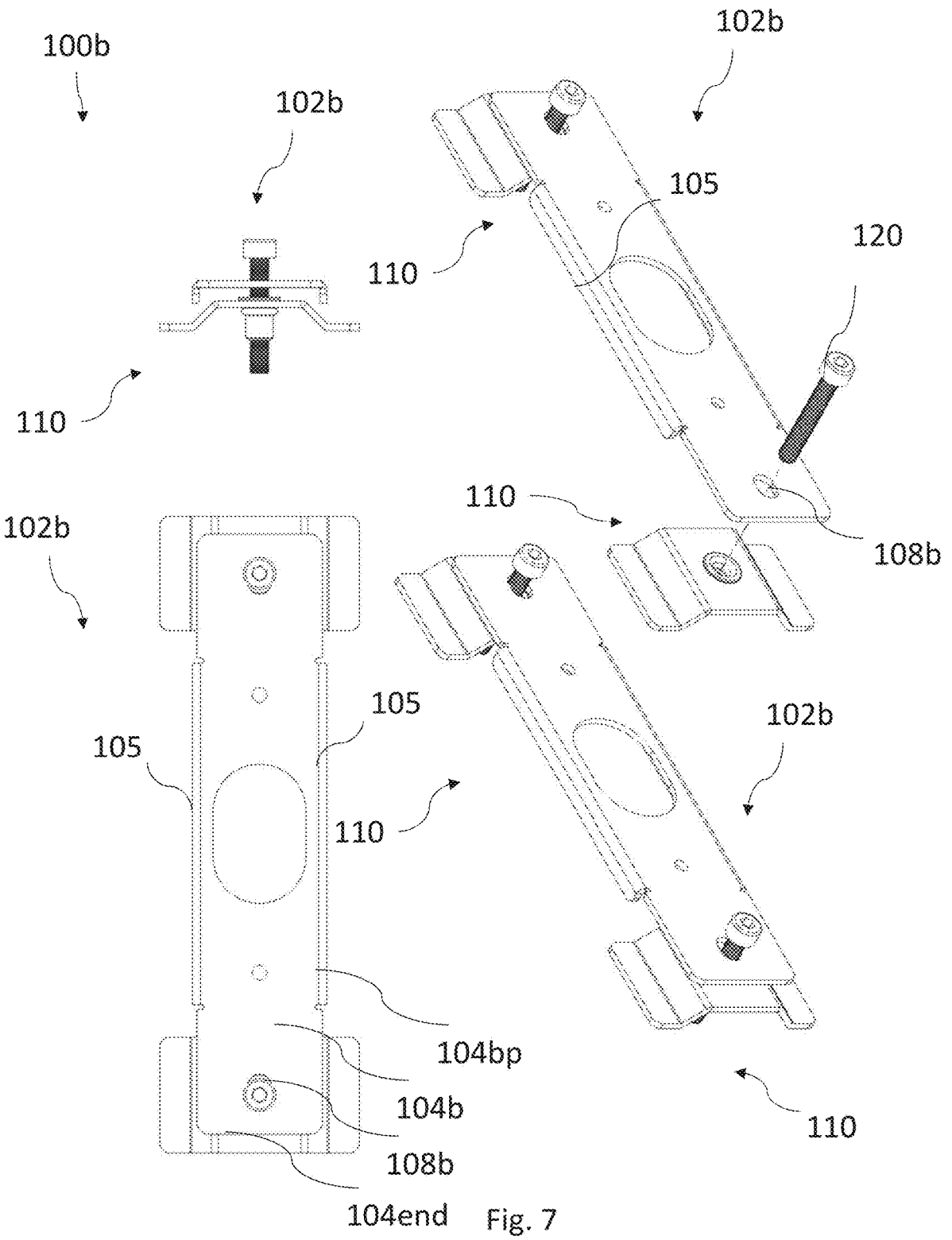

FIG. 7 schematically includes various views of a mounting kit 100b according to the present disclosure. The mounting kit 100b is similar to the mounting kit 100, 100a discussed above. The mounting kit 100b includes a front plate 102b and two back plates 110. The front plate 102b has a substantially planar body 104b with a profile 104bp. The front plate 102b includes fastener openings 108 formed relatively close to an end edge 104end of the body 104b. When installed, the back plates 110 may extend beyond the end edge 104end of the body 104b. The mounting kit 100b may be used to install a modular vehicle light to a relatively small or short vehicle opening.

Figure 8:
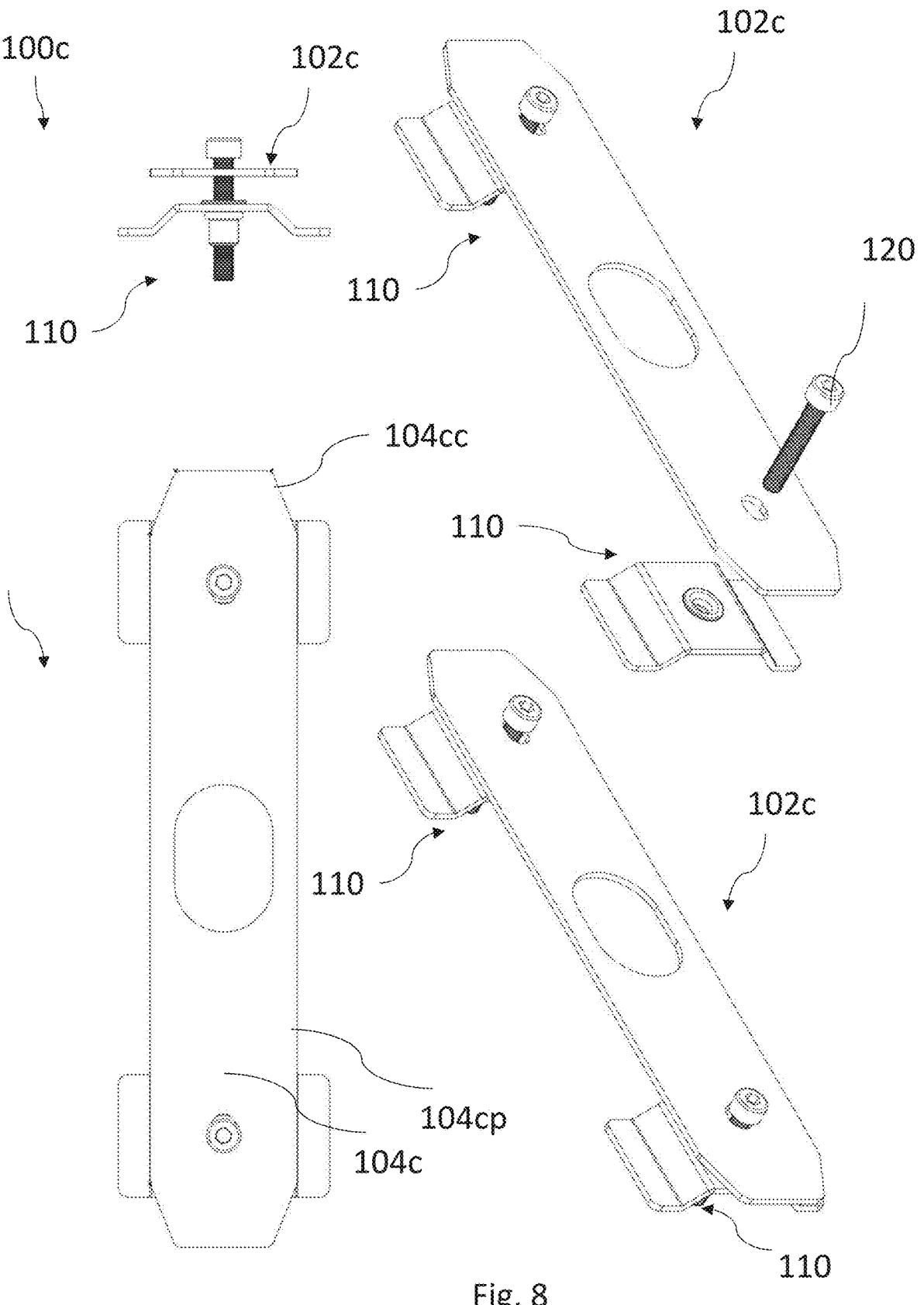

FIG. 8 schematically includes various views of a mounting kit 100c according to the present disclosure. The mounting kit 100c is similar to the mounting kits 100, 100a-100b discussed above. The mounting kit 100c includes a front plate 102c and two back plates 110. The front plate 102c has a substantially planar body 104c with a profile 104cp shaped to match an exist opening in a vehicle. The profile 104cp is substantially rectangular with chamfer edges 104cc at all four corners. Additionally, the front plate 102c does not include any alignment tabs, such as the alignment tabs 105.

Figure 9:
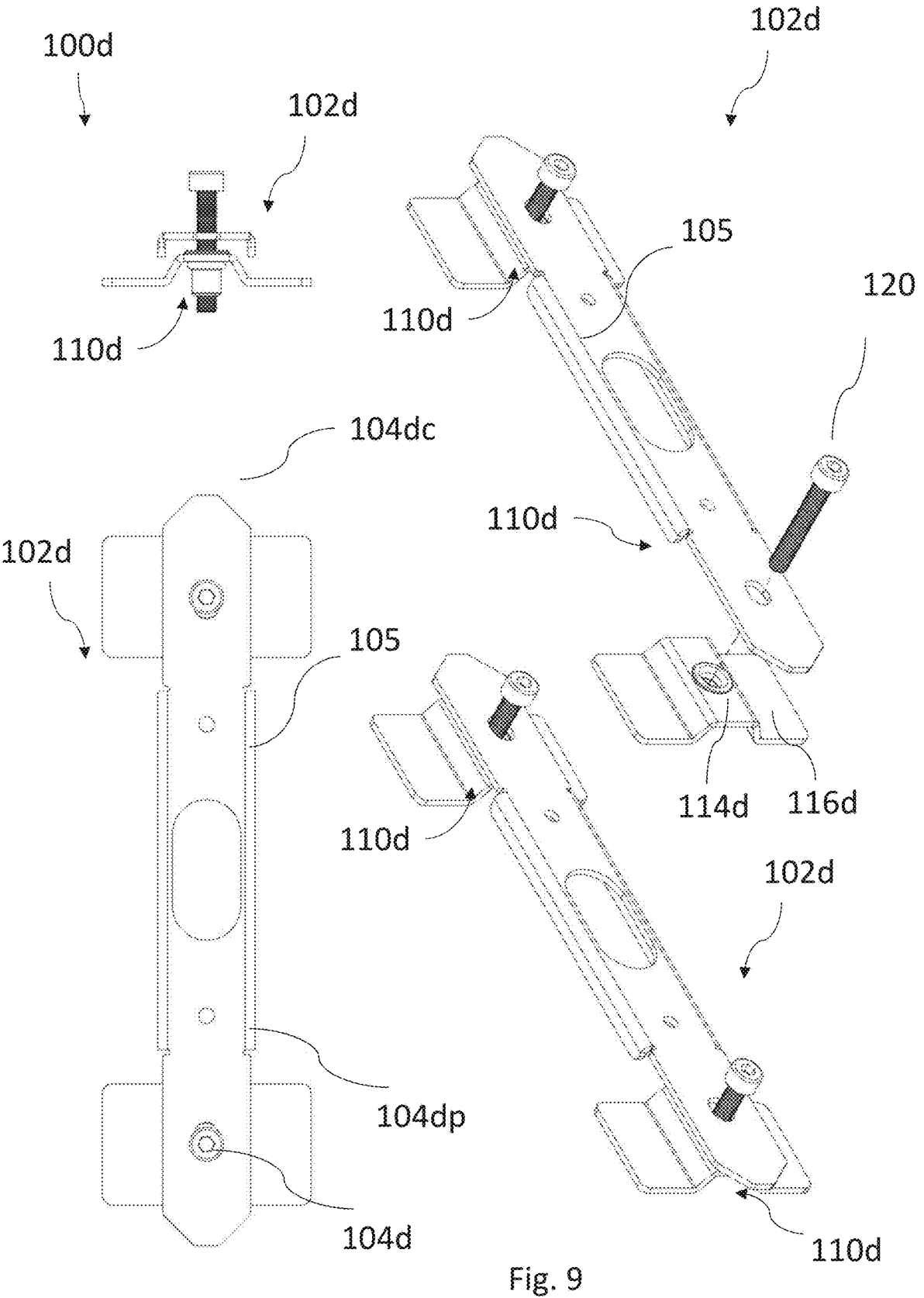

FIG. 9 schematically includes various views of a mounting kit 100d according to the present disclosure. The mounting kit 100d is similar to the mounting kit 100c discussed above except that the mounting kit 100d is designed to fit in a narrow opening. The mounting kit 100d includes a front plate 102d and two back plates 110d. The front plate 102d has a substantially planar body 104d with a profile 104dp shaped to match an exist opening in a vehicle. The profile 104dp is substantially rectangular with chamfer edges 104dc at all four corners. The planar body 104d is relatively narrower than the body 104c in the mounting kit 100c. The back plate 110d includes a narrower central panel 114d protruding over back panels 116d.

Figure 10:
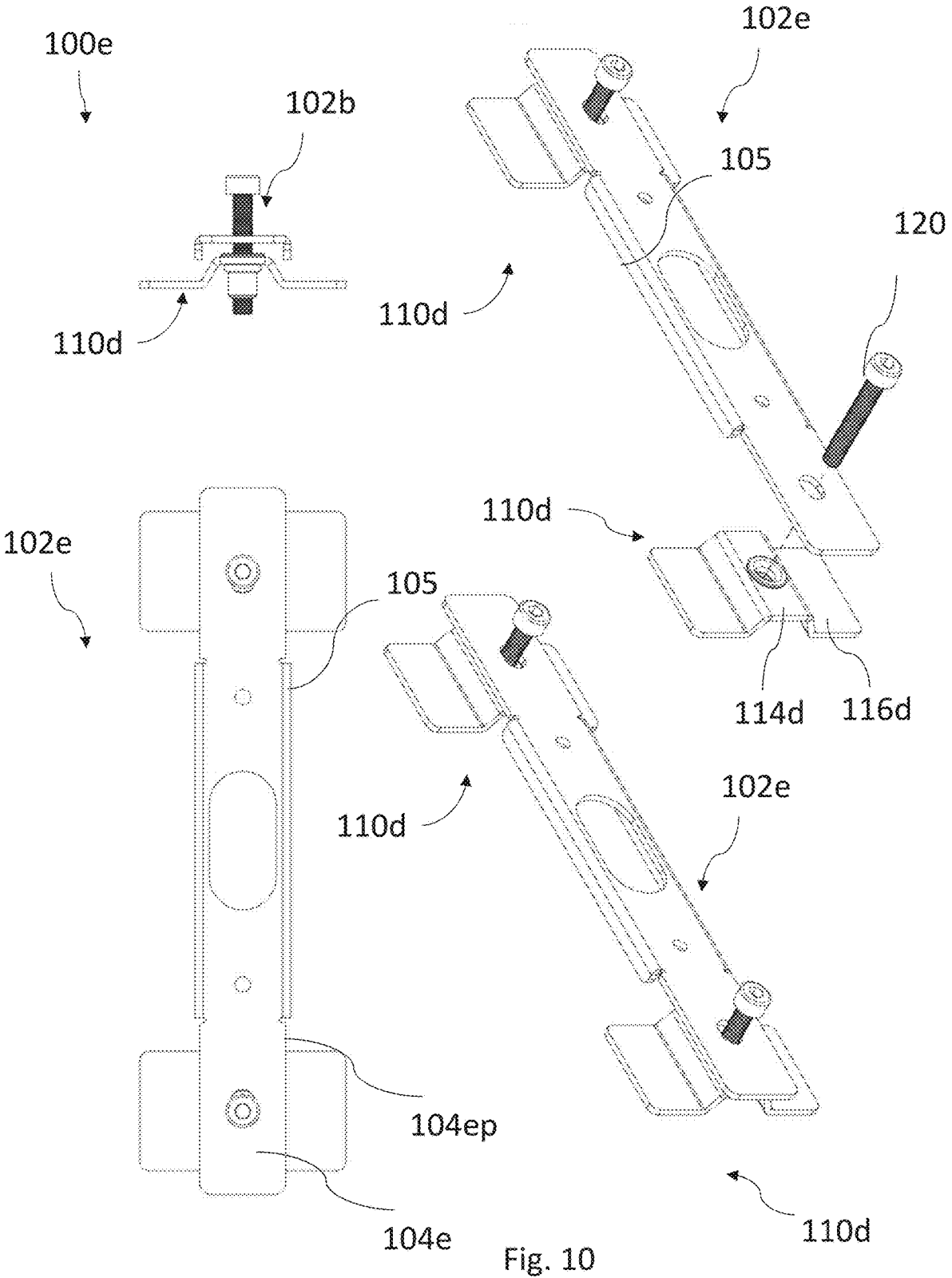

FIG. 10 schematically includes various views of a mounting kit 100e according to the present disclosure. The mounting kit 100e is similar to the mounting kit 100d discussed above except that the mounting kit 100e includes a front plate without chamfer edges. The mounting kit 100e includes a front plate 102e and two back plates 110d. The front plate 102e has a substantially planar body 104e with a profile 104ep shaped to match an exist opening in a vehicle. The profile 104ep is substantially rectangular.

Figure 11:

FIG. 11 schematically includes various views of a mounting kit 100f according to the present disclosure. The mounting kit 100f is similar to the mounting kits 100d and 100e discussed above except that the mounting kit 100f includes a front plate having elongated chamfer edges. The mounting kit 100f includes a front plate 102f and two back plates 110d. The front plate 102f has a substantially planar body 104f with a profile 104fp shaped to match an exist opening in a vehicle. The profile 104ep is substantially rectangular with elongated chamfer edges 104fc at the corners.

Figure 12:
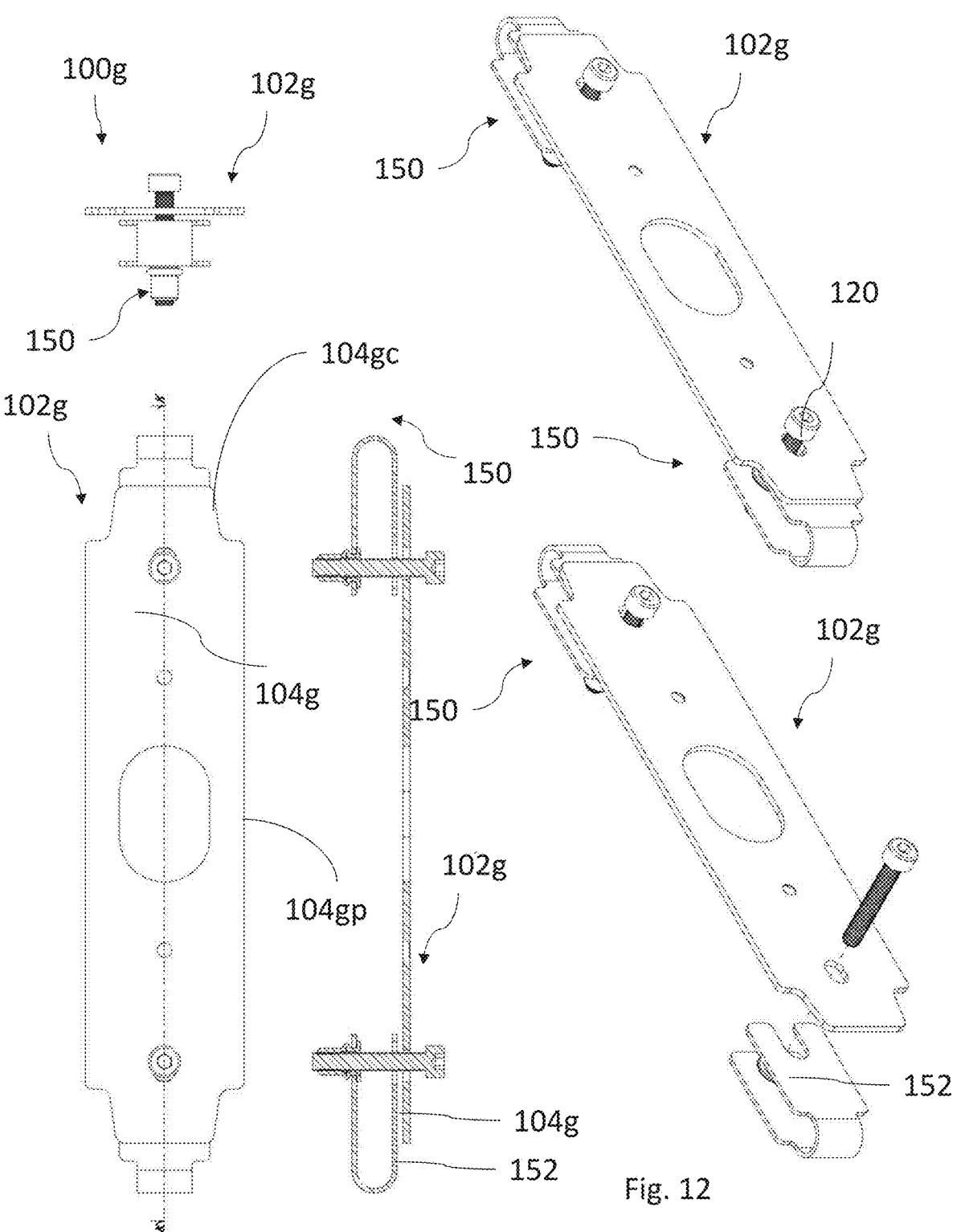

FIG. 12 schematically includes various views of a mounting kit 100g according to the present disclosure. The mounting kit 100g is similar to the mounting kits 100, and 100a-100f discussed above except that the mounting kit 100g includes back clips 150 in place of the back plates 110. The mounting kit 100g includes a front plate 102g and two back clips 150. The front plate 102g has a substantially planar body 104g with a profile 104gp. The profile 104gp may be substantially rectangular in shape with j-groove edges 104gc formed at the corners. The j-groove edges 104gc may result from maintaining a planar shape of the body 104g by omitting folding the alignment tabs 105. The planar body 104g enables the body 104g to form direct contact with the front panel 152 of the back clips 150, thereby, keeping the vehicle light being installed at a lower profile.

Figure 13:
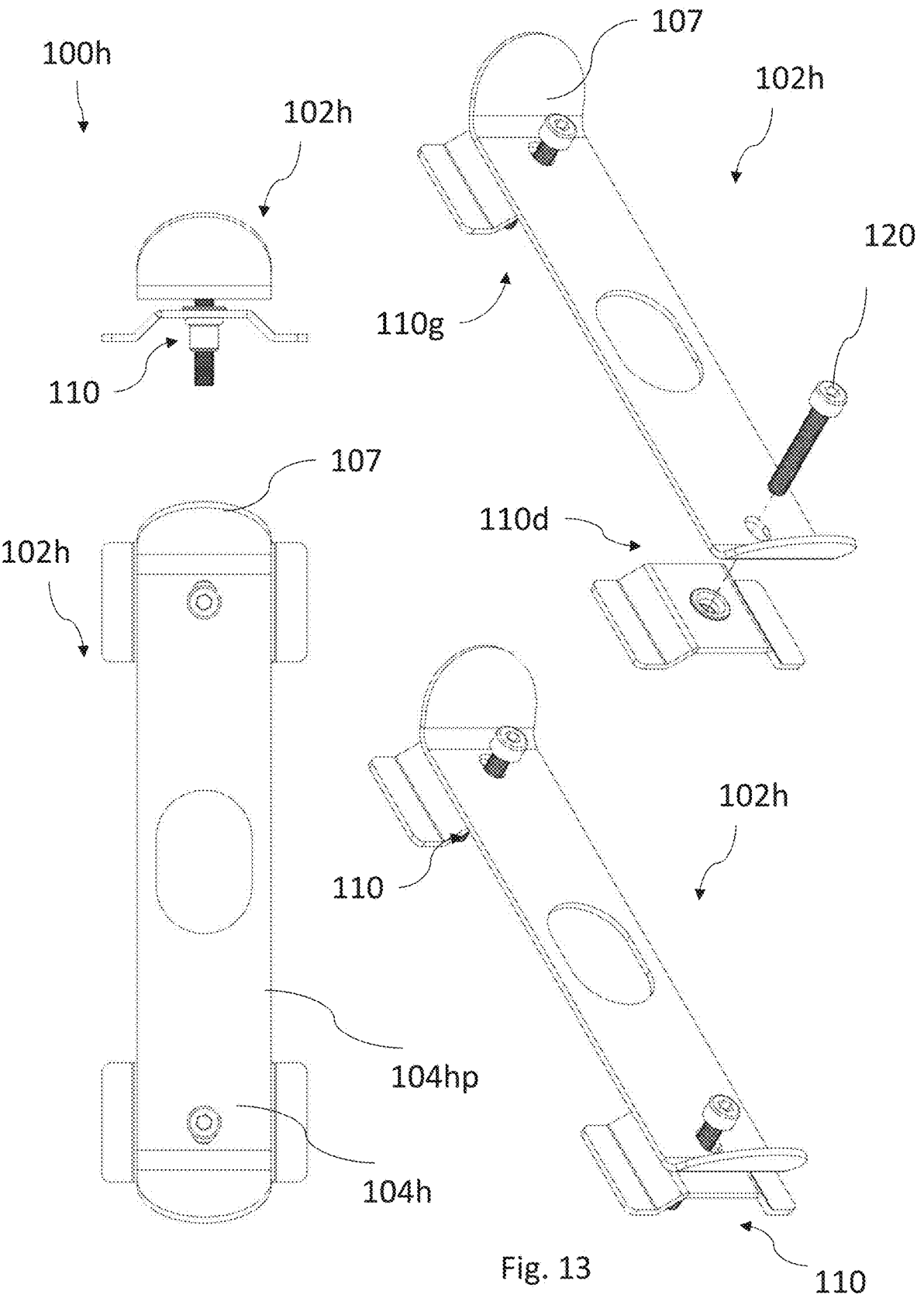

FIG. 13 schematically includes various views of a mounting kit 100h according to the present disclosure. The mounting kit 100h is similar to the mounting kit 100c discussed above except that the mounting kit 100g includes a front plate with end tabs. The mounting kit 100h includes a front plate 102h and two back plates 110d. The front plate 102g has a body 104h with a profile 104hp. End tabs 107 may be formed at two ends of the body 104h. When assembled, the end tabs 107 face the exterior side of the vehicle. The vehicle light may be at least partially disposed in a recess volume defined by the body 104h and the end tabs 107. Using the mounting kit 100h to mount a vehicle light may achieve the effect of recessed the vehicle light in a vehicle opening.

Figure 14:
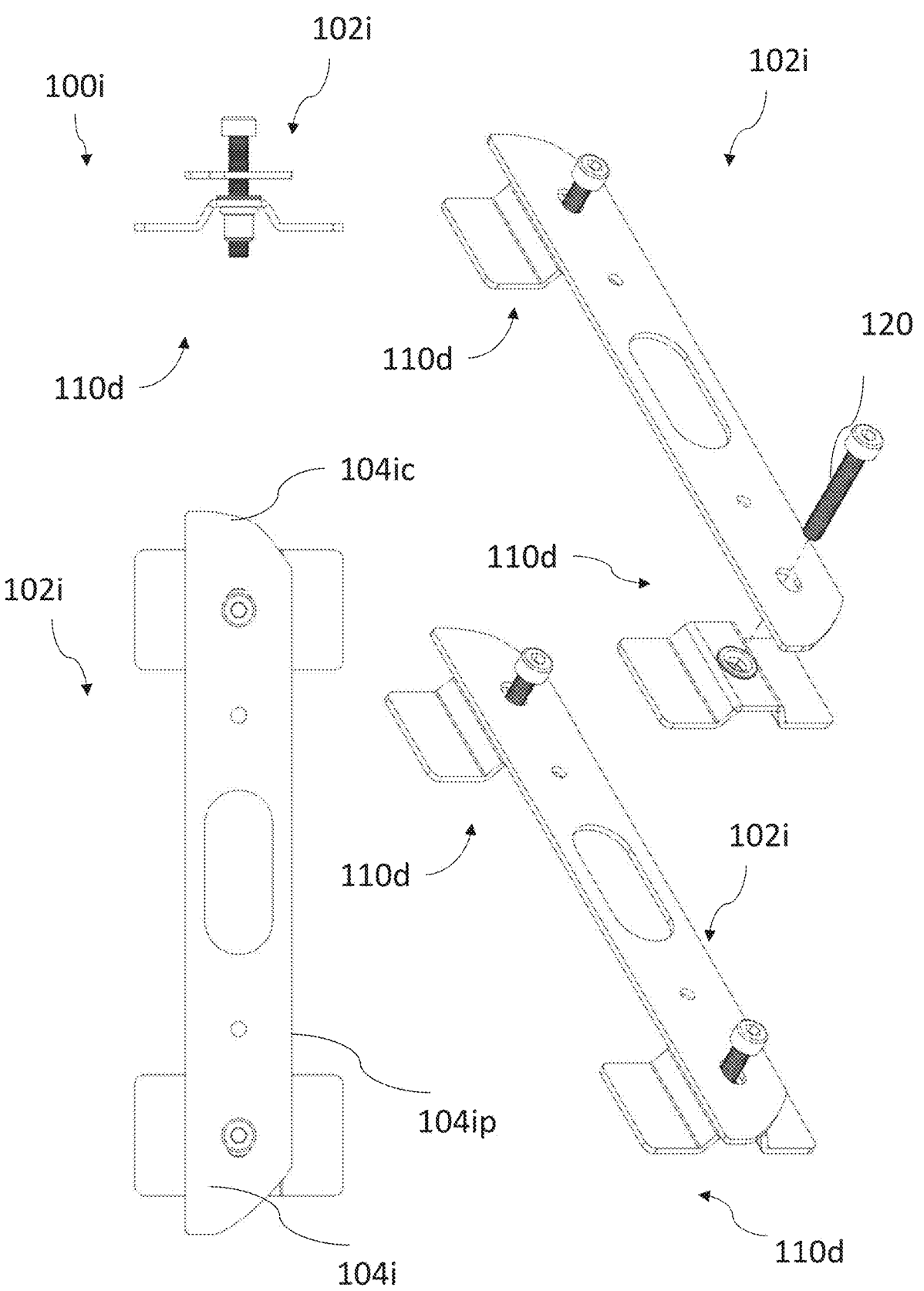

FIG. 14 schematically includes various views of a mounting kit 100i according to the present disclosure. The mounting kit 100i is similar to the mounting kit 100c discussed above except that the mounting kit 100i includes a front plate with rounded corners. The mounting kit 100i includes a front plate 102i and two back plates 110d. The front plate 102i has a substantially planar body 104i with a profile 104ip shaped to match an exist opening in a vehicle. The profile 104ip is substantially rectangular with one or more rounded corners 104ic.

Figure 15:
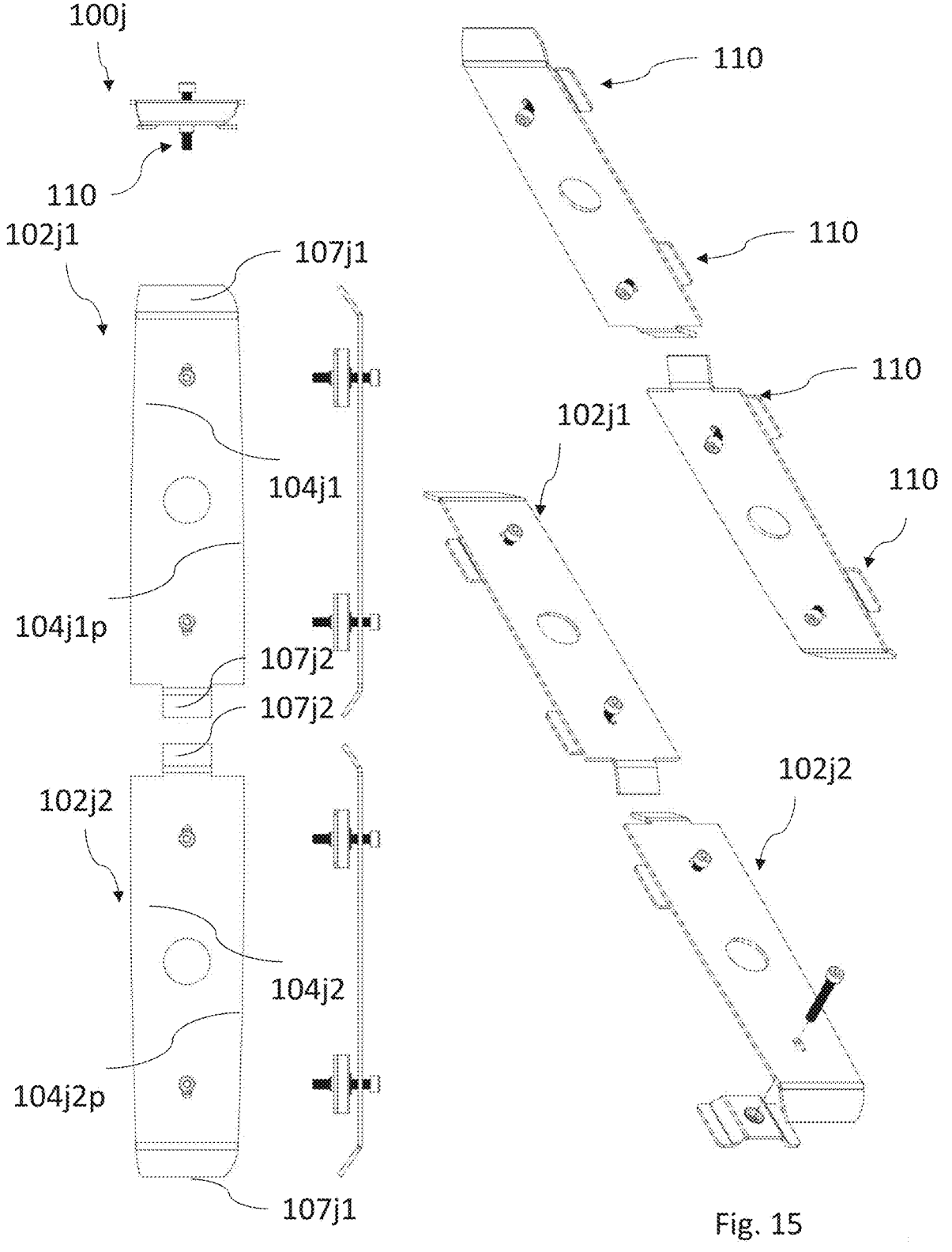

FIG. 15 schematically includes various views of a mounting kit 100j according to the present disclosure. The mounting kit 100j includes two front plates 102j1, 102j2 symmetrical to each other and four back plates 110. The mounting kit 100j may be used to install vehicle lights at symmetrical locations on a vehicle. The front plates 102j1, 102j2 include bodies 104j1, 104j2 respectively. The body 104j1, 104j2 has a profile 104jp1, 104jp2 shaped to match an exist opening in a vehicle. Each of the front plates 102j1, 102j2 may include end tabs 107j1, 107j2. In some embodiments, the end tabs 107j1, 107j2 may bend towards the interior side of the vehicle after installation. The end tabs 107j1, 107j2 may be at a slope relative to the bodies 104j1, 104j2. In some embodiments, the end tabs 107j1, 107j2 may be different in shape and size to suite openings in the vehicle.

Figure 16:
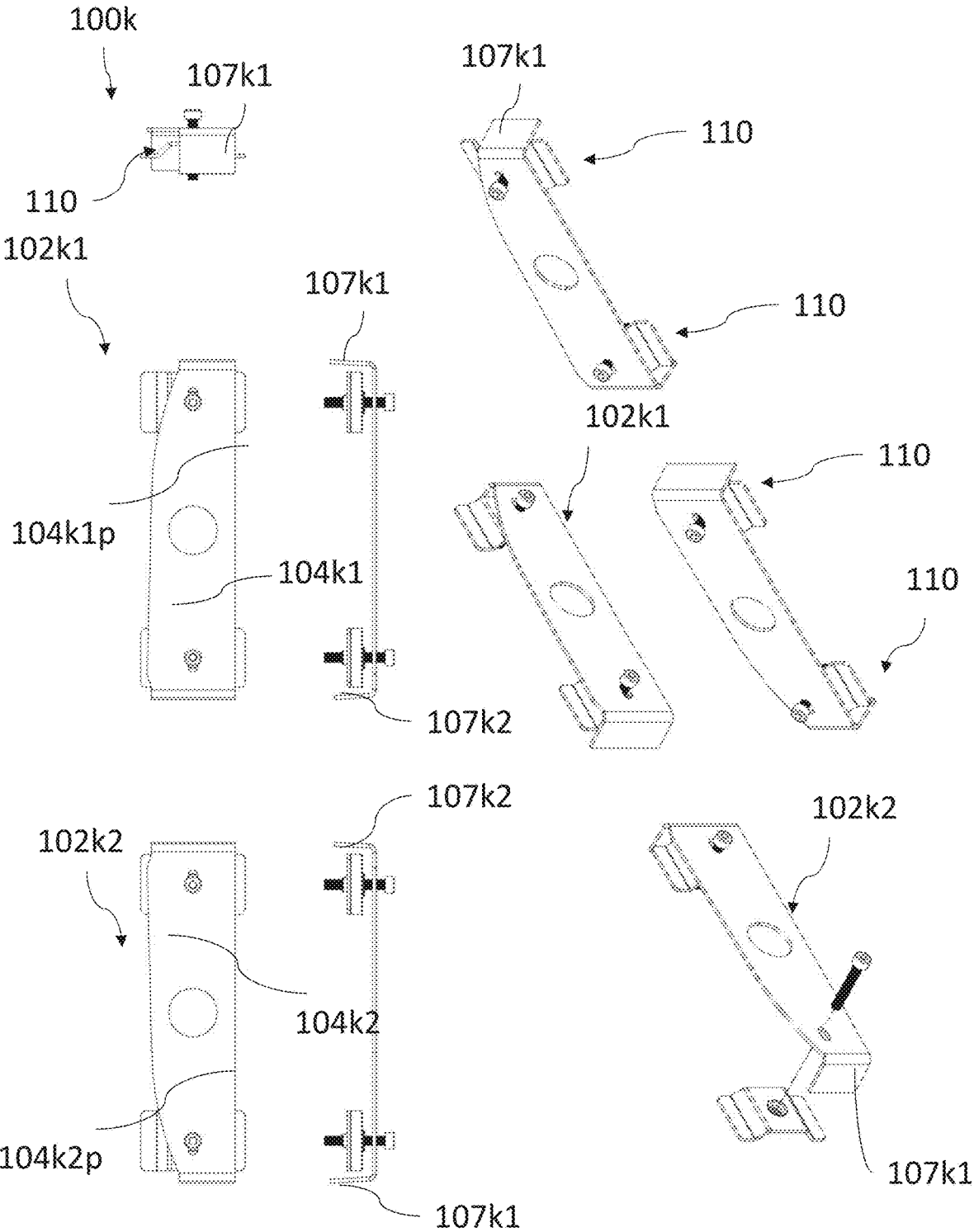

FIG. 16 schematically includes various views of a mounting kit 100k according to the present disclosure. The mounting kit 100k is similar to the mounting kit 100j except with front plates of different configurations. The mounting kit 100k includes two front plates 102k1, 102k2 symmetrical to each other and four back plates 110. The mounting kit 100k may be used to install vehicle lights at symmetrical locations on a vehicle. The front plates 102k1, 102k2 include bodies 104k1, 104k2 respectively. The body 104k1, 104k2 has a profile 104kp1, 104kp2 shaped to match an exist opening in a vehicle. Each of the front plates 102k1, 102k2 may include end tabs 107k1, 107k2. In some embodiments, the end tabs 107k1, 107k2 may bend towards the interior side of the vehicle after installation. The end tabs 107k1, 107k2 form a right angle relative to the bodies 104k1, 104j2. In some embodiments, the end tabs 107k1, 107k2 may be different in shape and size to suite openings in the vehicle.

FIGS. 17-28 schematically illustrate various vehicle mounting kits according embodiments the present disclosure. FIG. 17A includes various views of a mounting kit 200 according to the present disclosure. Comparing to the mounting kit 100, the mounting kit 200 may be used to mount heavy weight vehicle lights, such as vehicle head lights and work lights, onto a vehicle without modifying the vehicle.

The mounting kit 200 may include a front plate 202 and one or more back plates 210. The front plate 202 includes a panel body 204 and two light mounting plates 207. The panel body 204 may be substantially planar. The shape of the panel body 204 may be customized according to the vehicle to be installed. In some embodiments, an outer profile 204p of the panel body 204 may have a shape to match a profile of an existing opening in a vehicle so that the panel body 204 would fit in the existing opening upon installation. For example, the outer profile 204p of the panel body 204 may be shaped to fit an opening in a vehicle grille.

In some embodiments, the panel body 204 may include one or more fastener openings 208 to receiving one or more fasteners, such as screws, there through. The one or more fastener openings 208 are configured to receive screws to fasten with one or more back plates 210. In some embodiments, four fastener openings 208 are formed through the panel body 204.

In some embodiments, the front plate 202 includes a light opening 206 formed through the panel body 204. In some embodiments, the light opening 206 may be formed through a center portion of the panel body 204. The light opening 206 may be shaped to receive a vehicle light therein. In some embodiments, the light opening 206 may have a standard size to receive various modular vehicle lights. The fastener openings 208 may be disposed around the light opening 206.

In some embodiments, the front plate 202 includes two light mounting plates 207 attached to a back side of the panel body 204. The light mounting plates 207 may be disposed across the light opening 206. In some embodiments, the light mounting plates 207 may be parallel to each other. One or more light mounting openings 209 may be formed through the light mounting plates 207. During installation, a vehicle light may be inserted into the light opening 206, secured to the front plate 202 using fasteners through the one or more light mounting openings 209.

In some embodiments, the front plate 202 may include alignment tabs 205 on an upper edge and a lower edge of the panel body 204. The alignment tabs 205 may be positioned in a central portion of the panel body 204 and extend within a space between the fastener openings 208.

The back plate 210 may be shaped to be positioned flashed against a vehicle component, for example flashed against a vehicle grille. The back plate 210 may be similar to the back plate 110 with additional fastening openings 212 to provide additional support. As shown FIG. 17A, each back plate 210 may include two fastener openings 212 formed there through. The fastener openings 212 may be placed at a distance to match with the fastener openings 208 on the front plate 202. is formed through the back plate 210. In some embodiments, the fastener openings 212 in the back plate 210 are threaded so that the back plate 210 may functions as a nut to secure with screws 220. In some embodiments, a threaded insert 213 may be inserted in each of the fastener openings 212. The threaded insert 213 provide an extended threaded portion, thus, allowing a strong threaded connection. In some embodiments, the fasteners 220 may be anti-theft hex screws. The fasteners 220 can only be tightened or loosened using an anti-theft hex key 222.

Figure 17A:
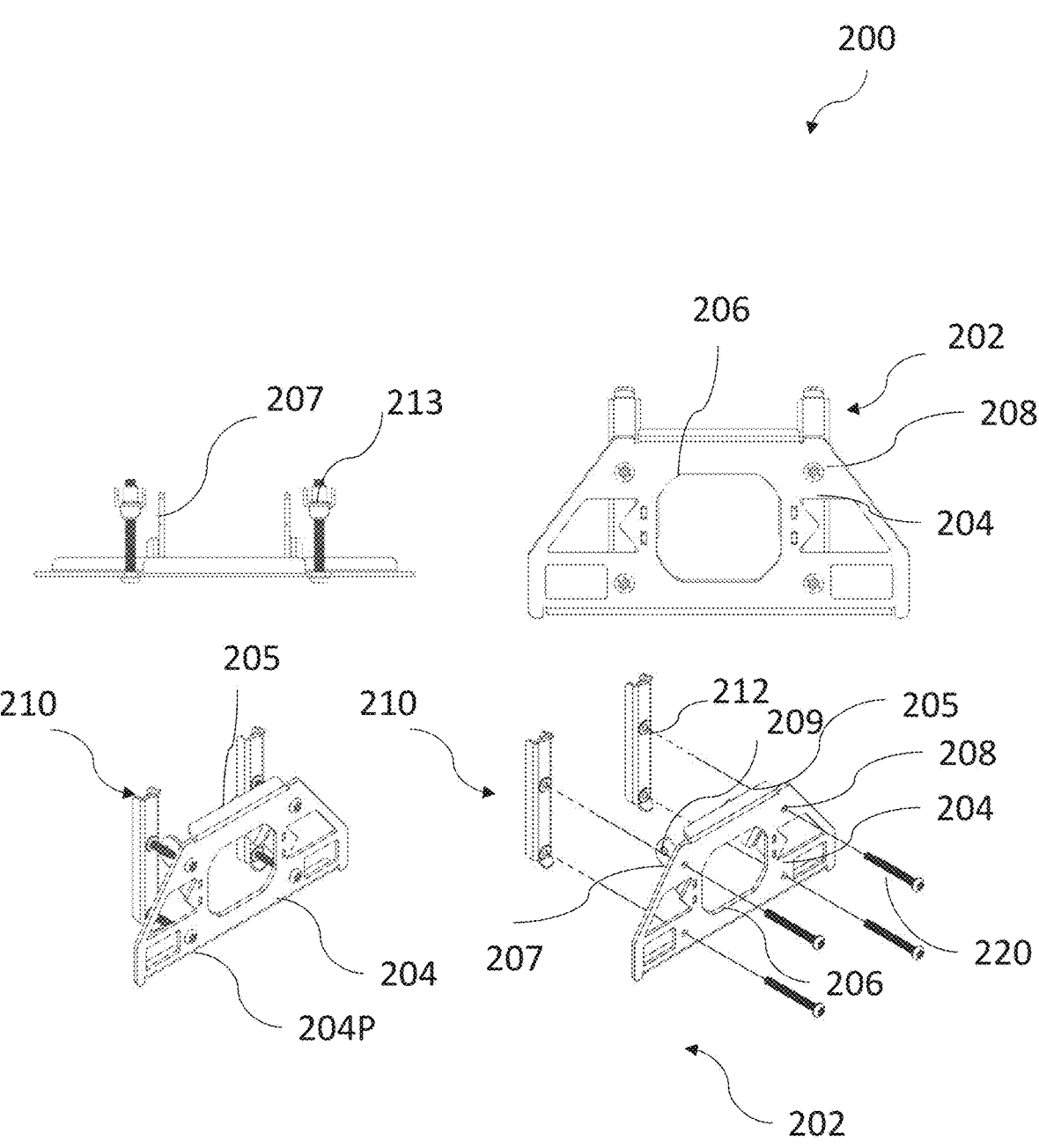
FIGS. 17A-17B, 18, 19A-19B, 20A-20B, 21A-21B, and 22-28 schematically illustrate various vehicle mounting kits according embodiments the present disclosure.
Figure 17B:
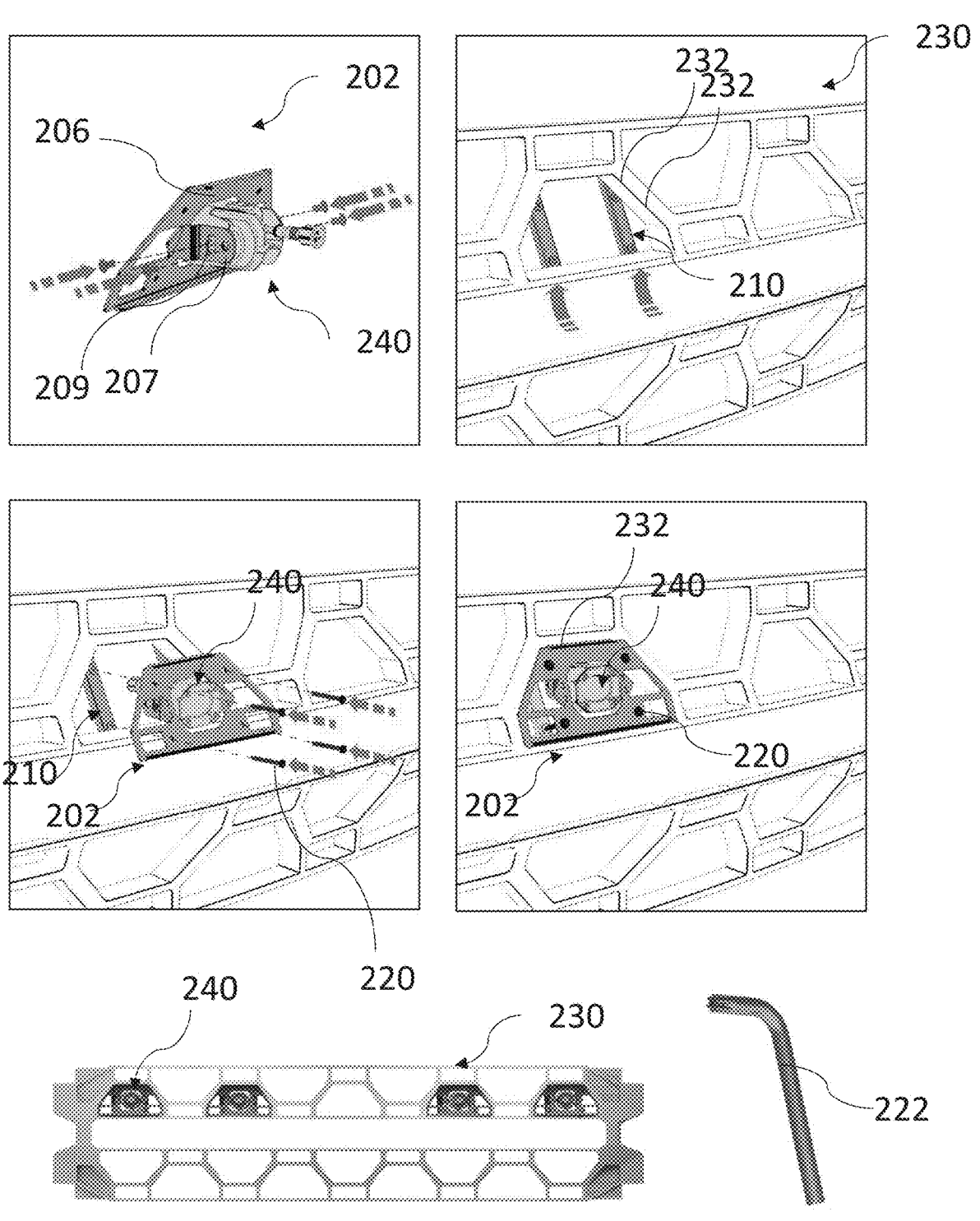

FIG. 17B illustrates a process of installing a vehicle light 240 on an opening of a vehicle grille 230 using the mounting kit 200 and the vehicle grille 230 with multiple vehicle lights installed therein. As shown in FIG. 17B, the vehicle light 240 is first aligned with the front plate 202 and secured to the front plate 202. The vehicle light 240 may be secured to the front plate 202 using screws via the light mounting openings. Next the back plates 210 are temporally positioned behind the vehicle grille 230 across an opening 232. The two back plates 210 may be positioned to align with the vehicle light 240. The front plate 202 and the vehicle light 240 are then assembled to the back plates 210 across the vehicle grille 230 using the fasteners 220. The fasteners 220 are then tightened to securely mount the vehicle light 240 in the opening 232 of the vehicle grille 230.

The mounting kit 200 may be modified to mount vehicle lights of different shapes and into openings with different shapes. For example, the profile of the front plate 202 and the shape of the vehicle light opening 206 may be modified.

Figure 18:
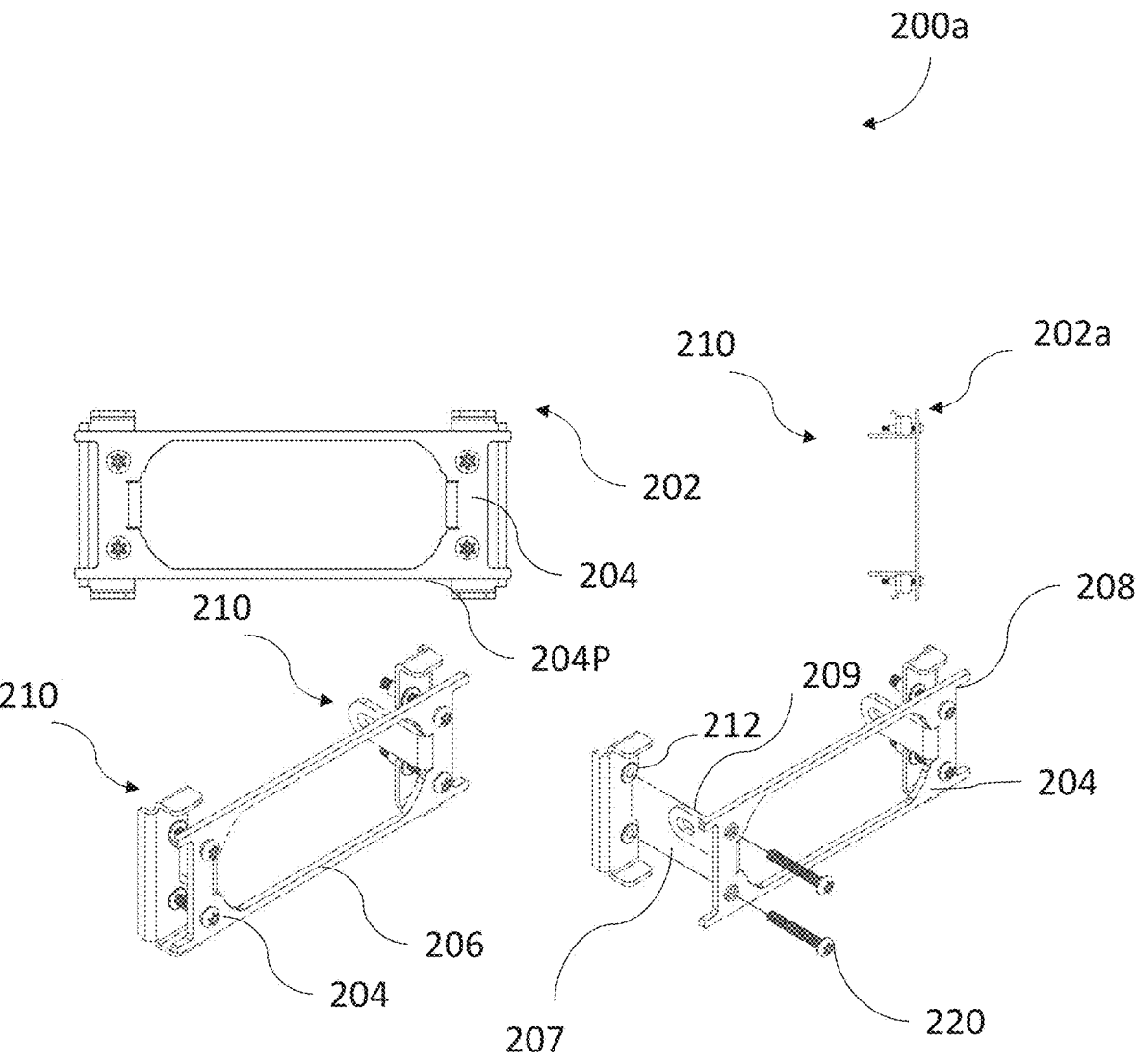

FIG. 18 includes various views of a mounting kit 200a according to the present disclosure. The mounting kit 200a is similar to the mounting kit 200 except with the front plate 202 and the light opening 206 have different shapes.

Figure 19A:
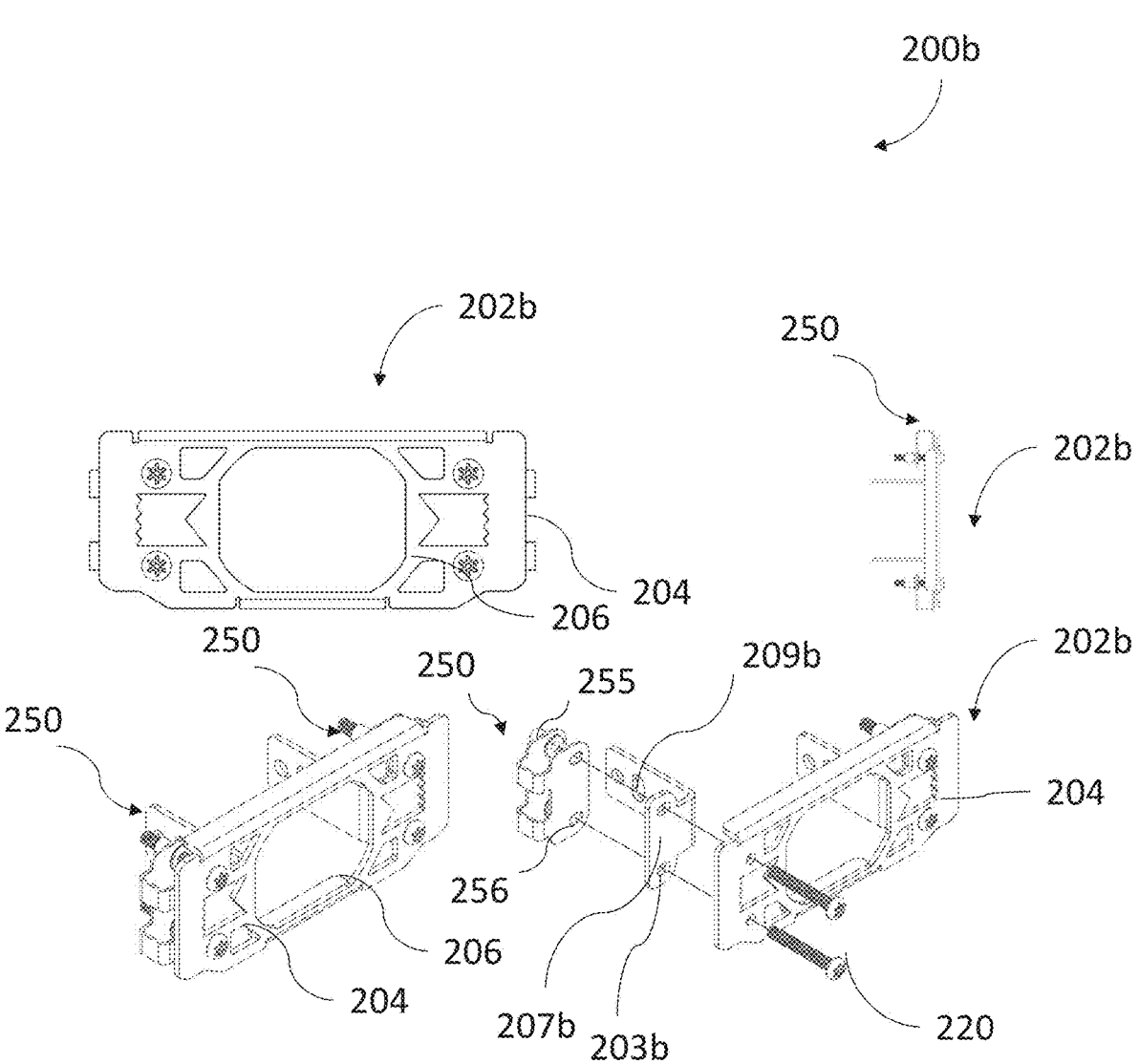

FIG. 19A includes various views of a mounting kit 200b according to the present disclosure. Similar to the mounting kit 200, 200a, the mounting kit 200b may be used to mount heavy weight vehicle lights, such as vehicle head lights and work lights, onto a vehicle without modifying the vehicle.

The mounting kit 200b may include a front plate 202b and one or more back clips 250. The front plate 202b includes a panel body 204b. The mounting kit 200b further include two mounting plates 207. Each of the mounting brackets 207b may be L-shaped brackets including light mounting opening 209b and fastener openings 203b.

The back clips 250 are used in place of the back plates 210. The back clip 250 may be similar to the back clip 150 with additional fastening openings 256 and threaded inserts 255 to provide additional support. As shown FIG. 19A, each back clips 250 may include two fastener openings 256 and two threaded inserts 255. formed there through. The fastener openings 256 and the threaded inserts 255 may be placed at a distance to match with the fastener openings 208b on the front plate 202b.

Figure 19B:
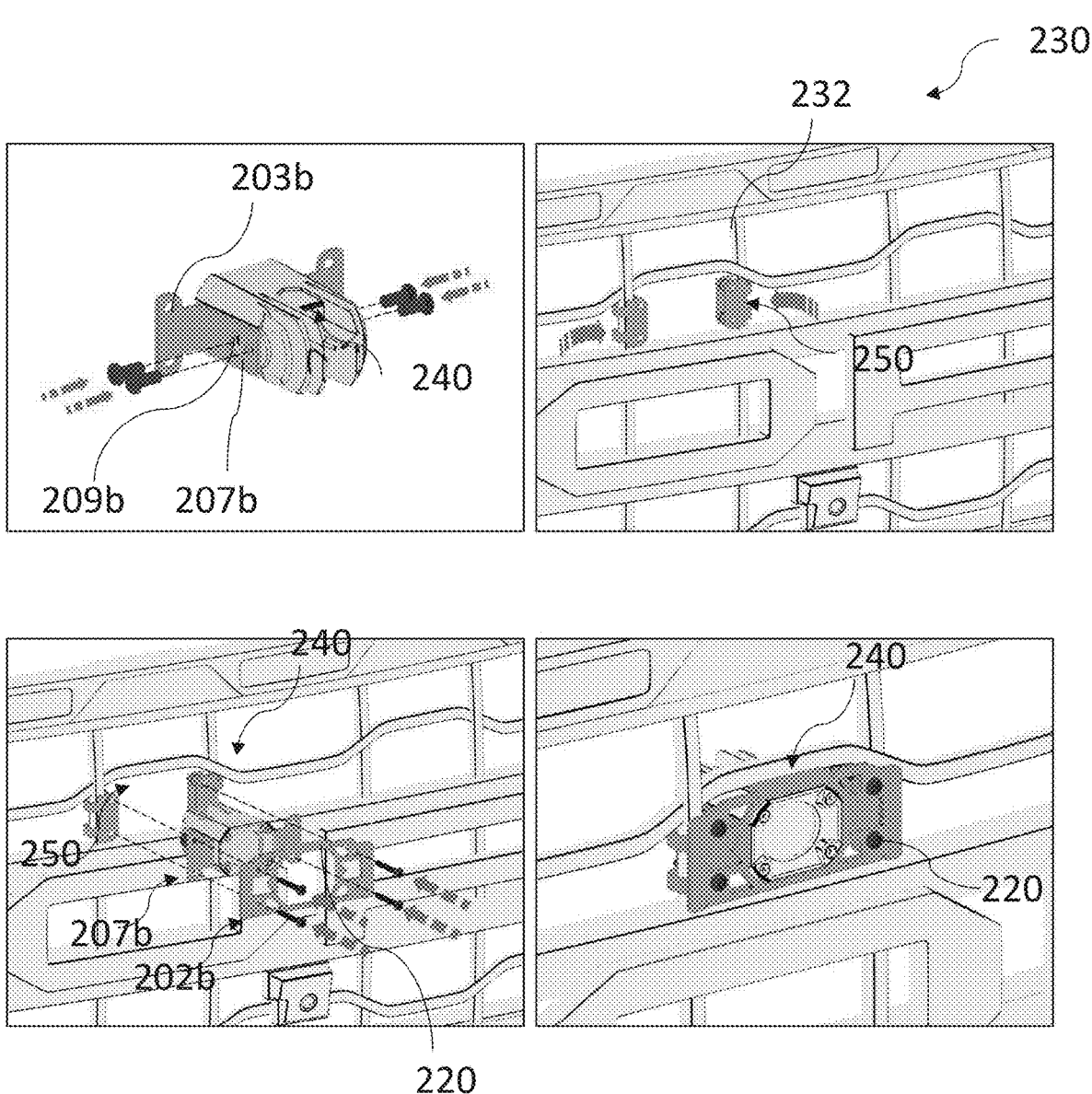

FIG. 19B illustrates a process of installing a vehicle light 240 on an opening of a vehicle grille 230 using the mounting kit 200b and the vehicle grille 230 with multiple vehicle lights installed therein. As shown in FIG. 19B, the vehicle light 240 is first secured to the mounting brackets 207b. The vehicle light 240 may be secured to the mounting brackets 207b using screws via the light mounting openings 209b. Next the back clips 250 are temporally positioned behind the vehicle grille 230 across an opening 232. The front plate 202b, the mounting brackets 207b, and the back clips 250 are assembled across the vehicle grille 230 using the fasteners 220. The fasteners 220 are then tightened to securely mount the vehicle light 240 in the opening 232 of the vehicle grille 230.

Figure 20A:
Figure 20A:
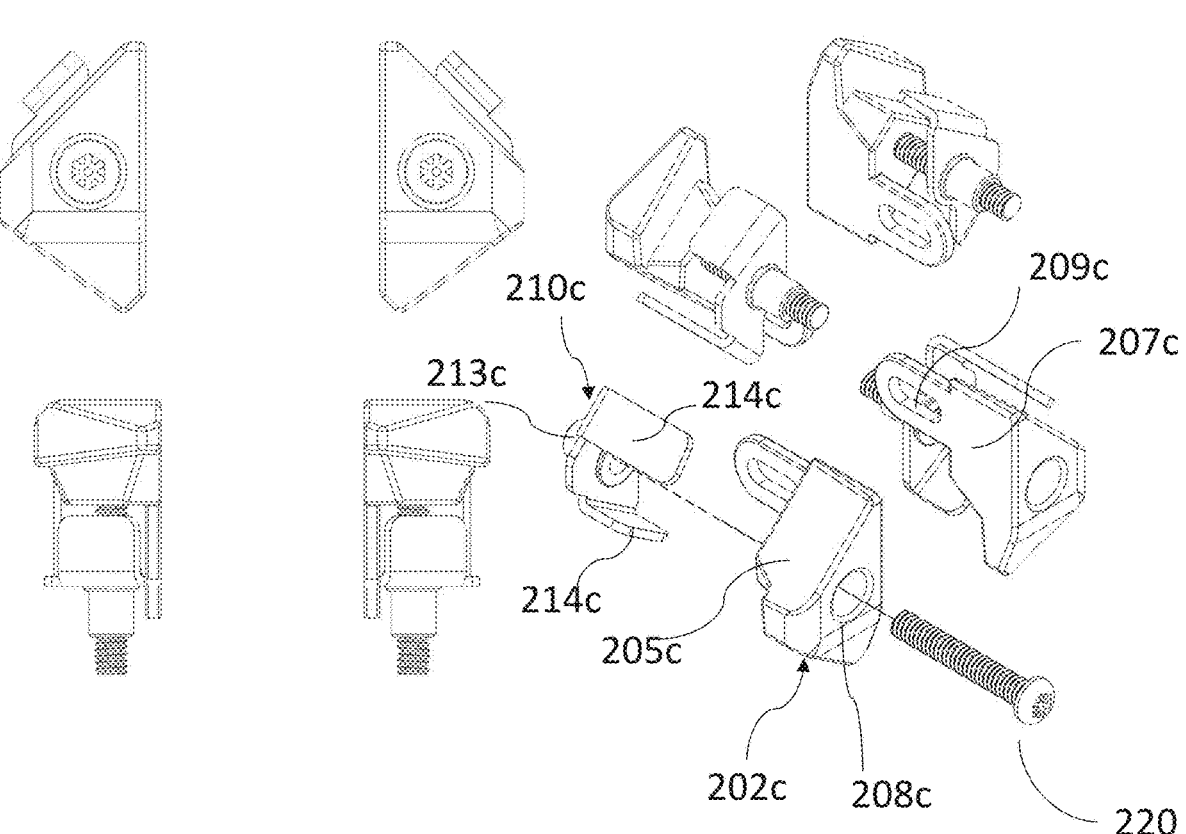

FIG. 20A includes various views of a mounting kit 200c according to the present disclosure. The mounting kit 200c may be used in pairs to amount a vehicle light. The mounting kit 200c may be used to mount vehicle lights of any length.

The mounting kit 200c may include a front plate 202c and a back plate 210c. The front plate 202c includes a panel body 204c and a mounting bracket 207c attached to the panel body 204c. The panel body 204c may be shaped to fit in an end portion of a vehicle opening. In some embodiments, the front plate 202c may include an alignment tab 205c. The front plate 202c may include a fastener opening 208c. The mounting bracket 207c may include a light mounting opening 209c.

The back plate 210c may include a threaded insert 213c to thread with a fastener 220. In come embodiments, the back plate 210c may include an alignment tab 214c. When assembled, the alignment tab 214c of the back plate 210c and the alignment tab 205c of the front plate 202c may interlock to facilitate tightening or loosening the fastener.

Figure 20B:
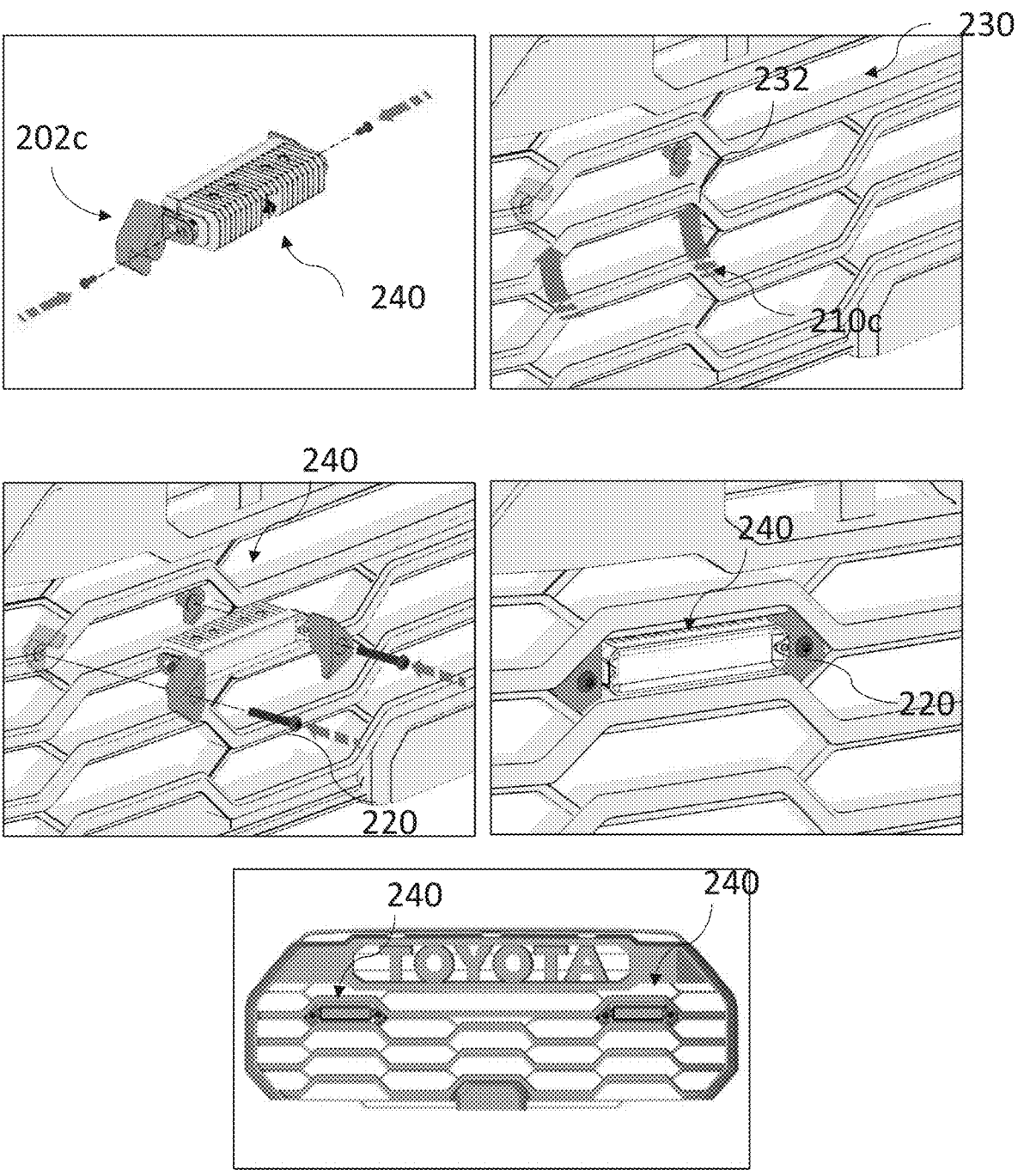

FIG. 20B illustrates a process of installing a vehicle light 240 on an opening of a vehicle grille 230 using the mounting kit 200c and the vehicle grille 230 with multiple vehicle lights installed therein. As shown in FIG. 20B, two front plates 202c are attached to ends of the vehicle light 240 using screws via the light mounting openings 209c of the front plates 202c. Next the back plates 210c are temporally positioned behind the vehicle grille 230 across an opening 232. The two back plates 210c may be positioned to align with the vehicle light 240. The front plates 202c and the vehicle light 240 are then assembled to the back plates 210 across the vehicle grille 230 using the fasteners 220. The fasteners 220 are then tightened to securely mount the vehicle light 240 in the opening 232 of the vehicle grille 230.

Figure 21A:
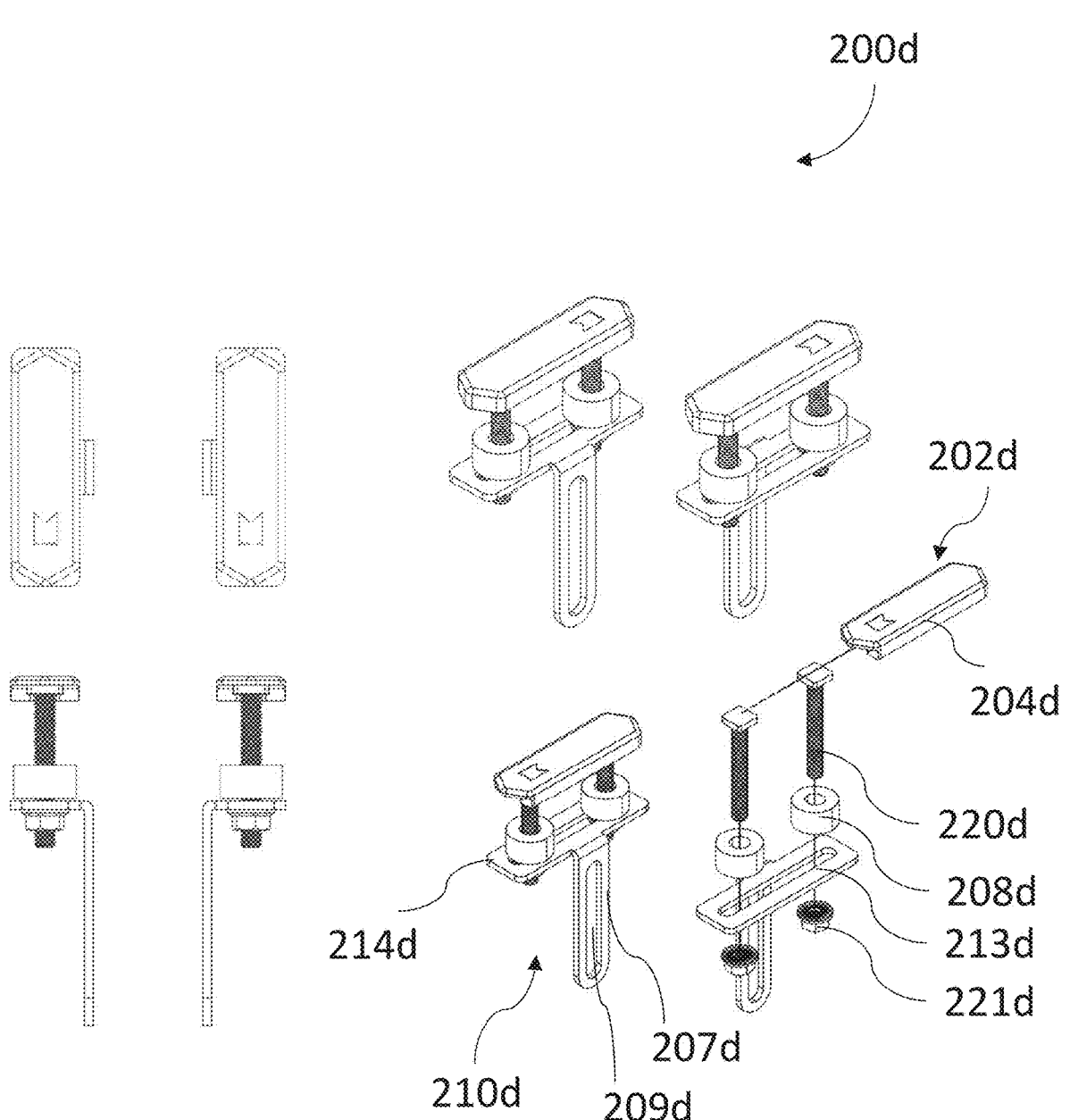

FIG. 21A includes various views of a mounting kit 200*d* according to the present disclosure. The mounting kit 200*d* may be used in pairs to amount a vehicle light. The mounting kit 200*d* may be used to mount vehicle lights of any length. In some embodiments, the mounting kit 200*d* may be used to mount a vehicle light behind a vehicle grille.

The mounting kit 200*d* may include a front plate 202*d* and a back plate 210*d*. The front plate 202*d* includes a panel body 204*d* and two or more screws 220*d* flexibly attached to the panel body 204*d*. In some embodiments, the screws 220*d* have rectangular heads which may slide along a track in the panel body 204*d* of the front plate 202*d*. In some embodiments, spacers 208*d* may be disposed on around the screws 220*d* to provide flexibility.

The back plate 210*d* may include a front panel 214*d* and a mounting panel 207*d*. The front panel 214*d* and the mounting panel 207*d* form a L-shape bracket. The front panel 214*d* may include an elongated fastener opening 213*d* to receive the screws 220*d* from the front plate 202*d*. The mounting panel 207*d* may include a light mounting opening 209*d*.

Figure 21B:
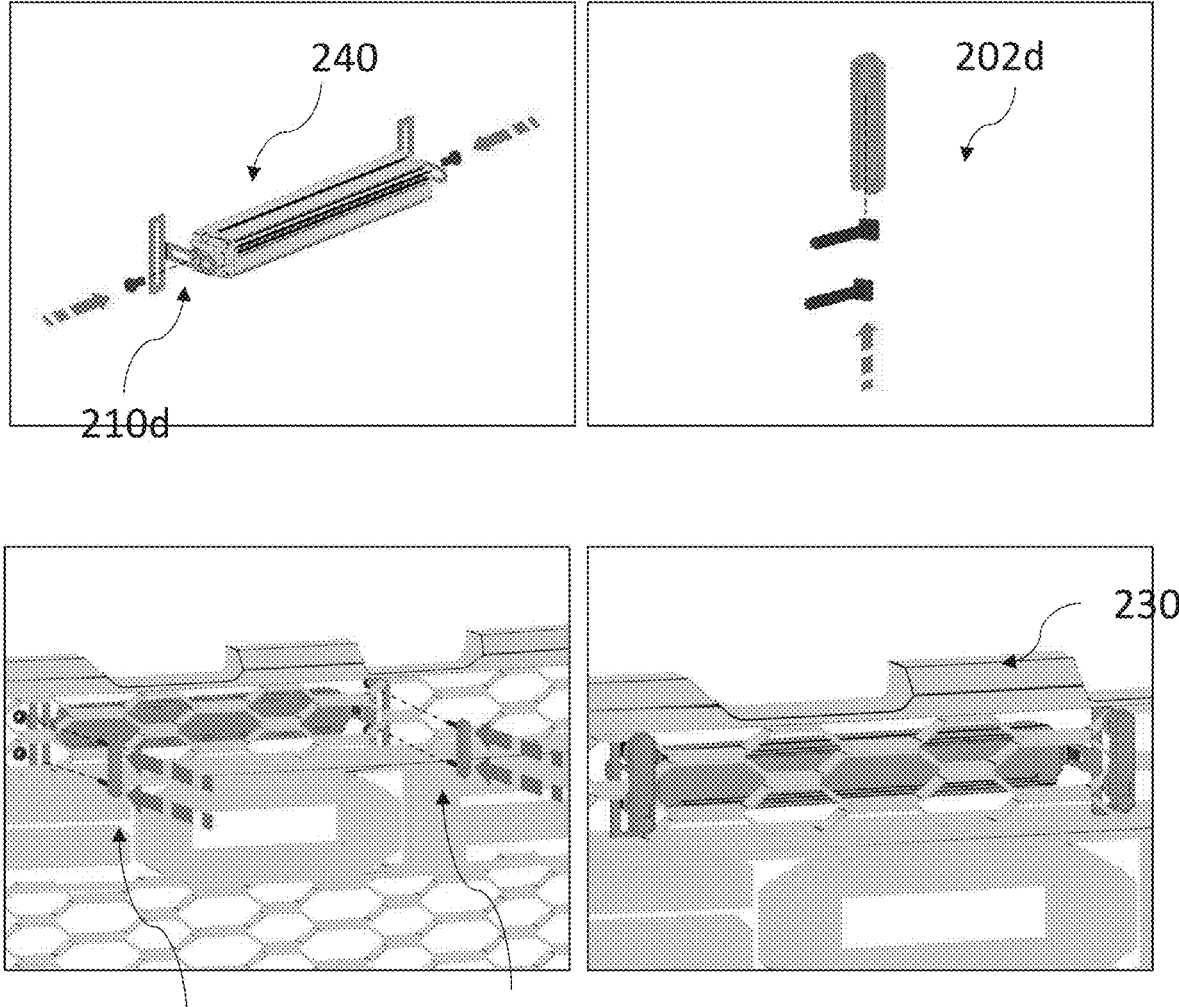

FIG. 21B illustrates a process of installing a vehicle light 240 behind a vehicle grille 230 using the mounting kit 200*d*. As shown in FIG. 21B, two back plates 210*d* are attached to ends of the vehicle light 240 using screws via the light mounting openings 209*d* of the back plates 210*d*. Next, the front plate 202*d* and the screws 220*d* are assembled together by sliding the screws 220*d* in the track of the front plate 202*d*. Positions of the screws 220*d* may be adjusted to locations of the openings in the vehicle grille 230. The back plates 210*d* and the vehicle light 240 are temporally positioned behind the vehicle grille 230. The two back plates 210*c* may be positioned to align with the vehicle light 240. The front plates 202*d* and the back plates 210*d* are then assembled across the vehicle grille 230 using the fasteners 220*d* and nuts 221*d*. The fasteners 220*d* are then tightened to securely mount the vehicle light 240 behind the vehicle grille 230.

Figure 22:
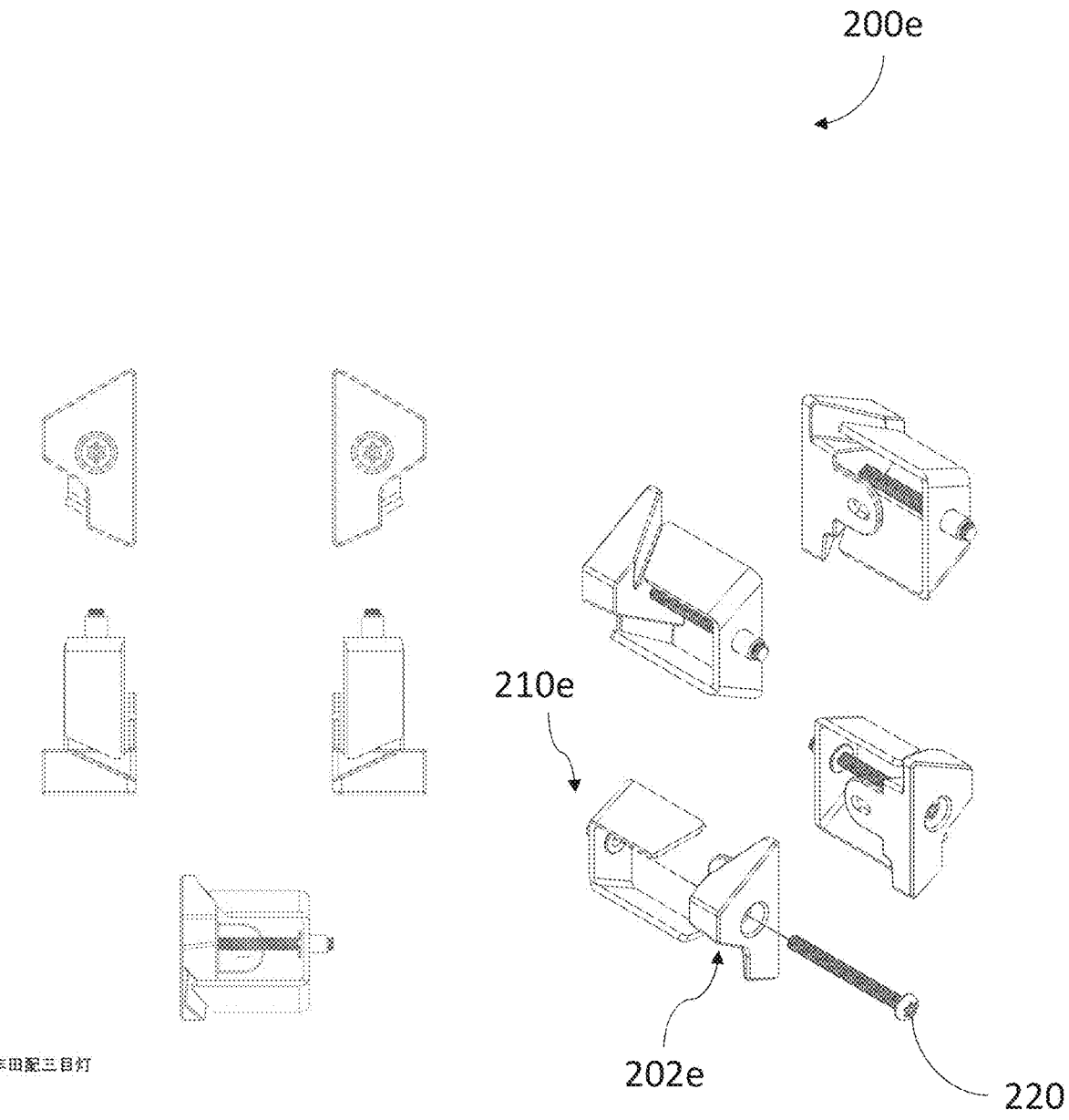
Figure 23:
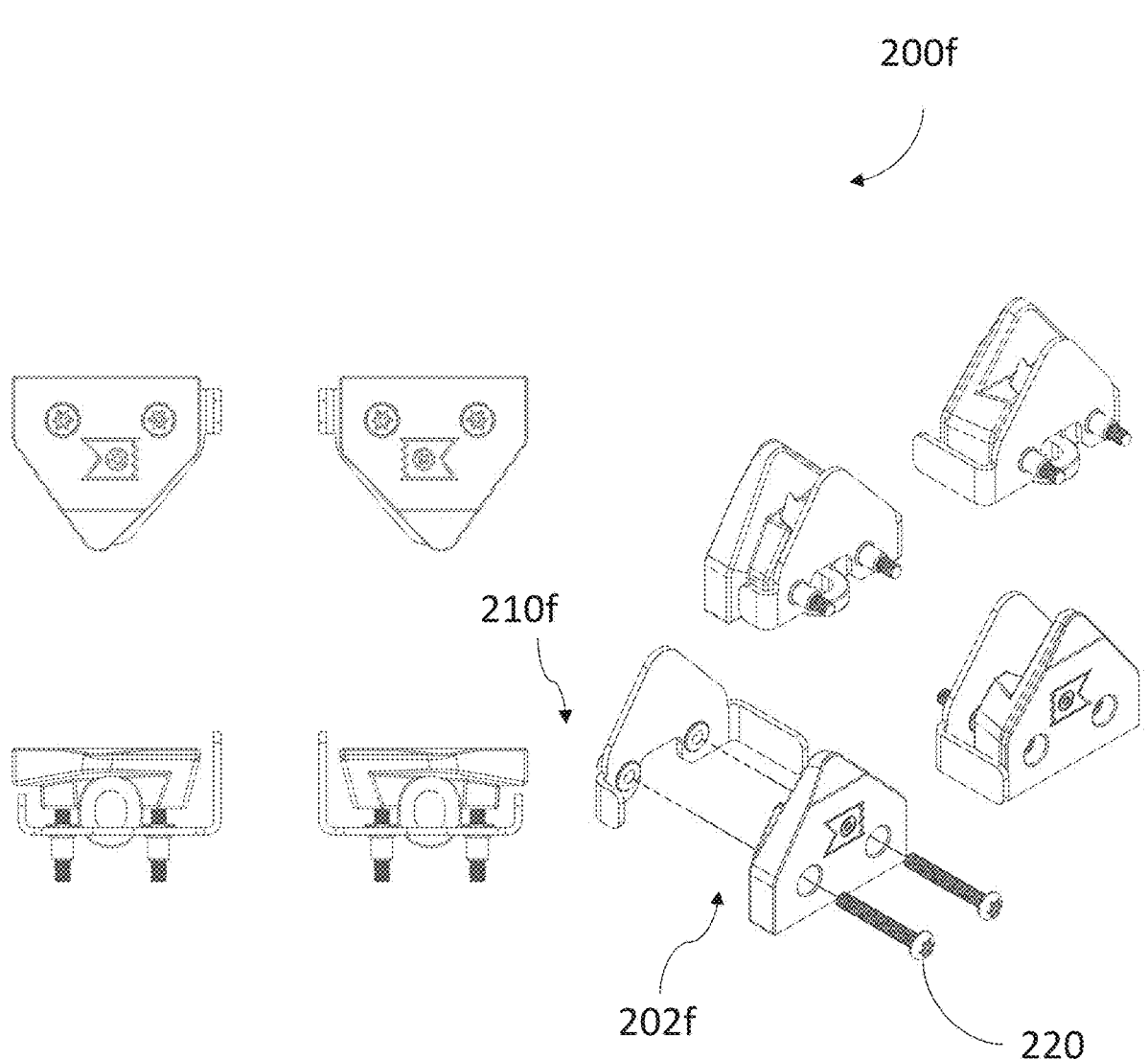
Figure 24:
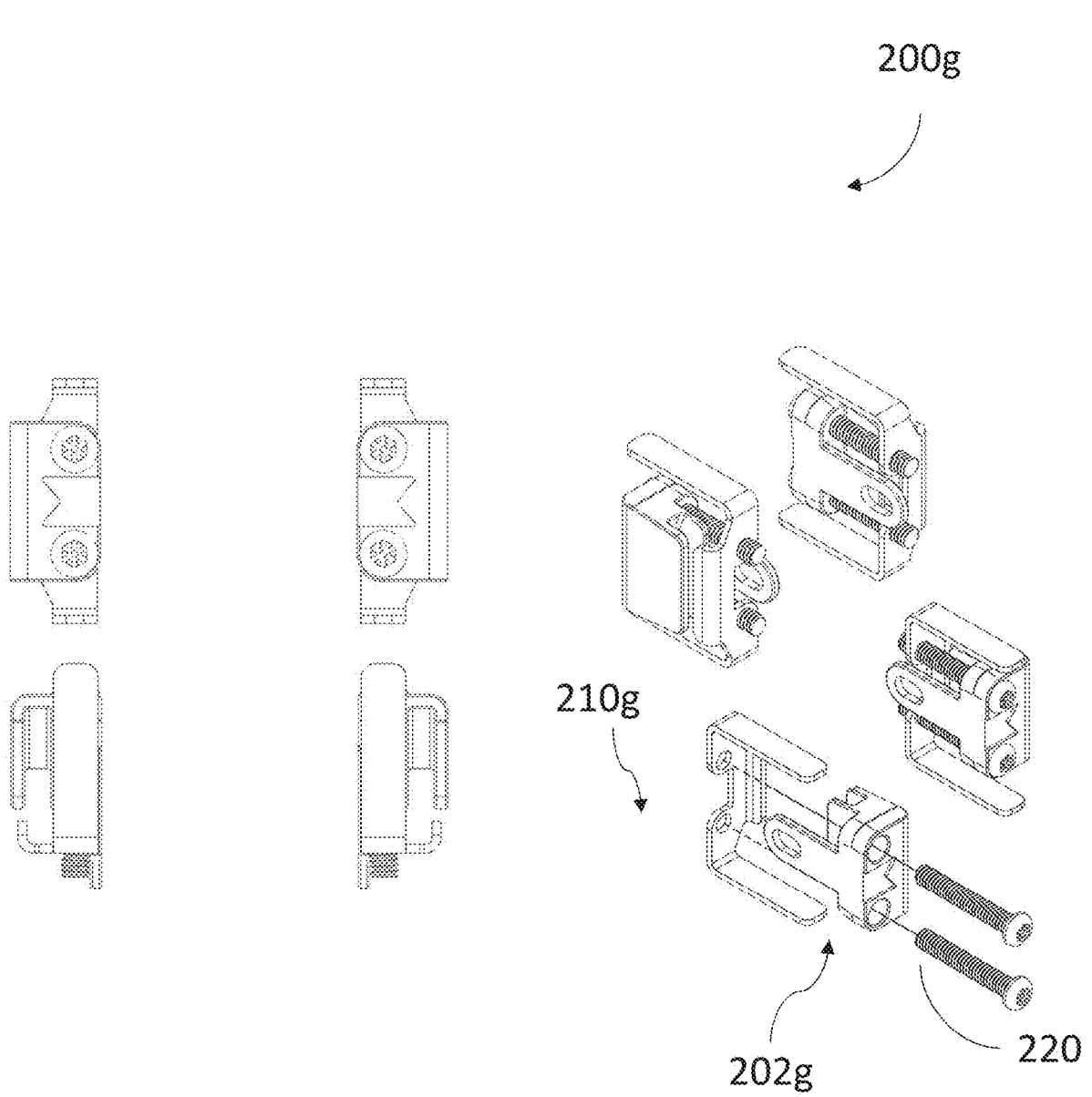
Figure 25:
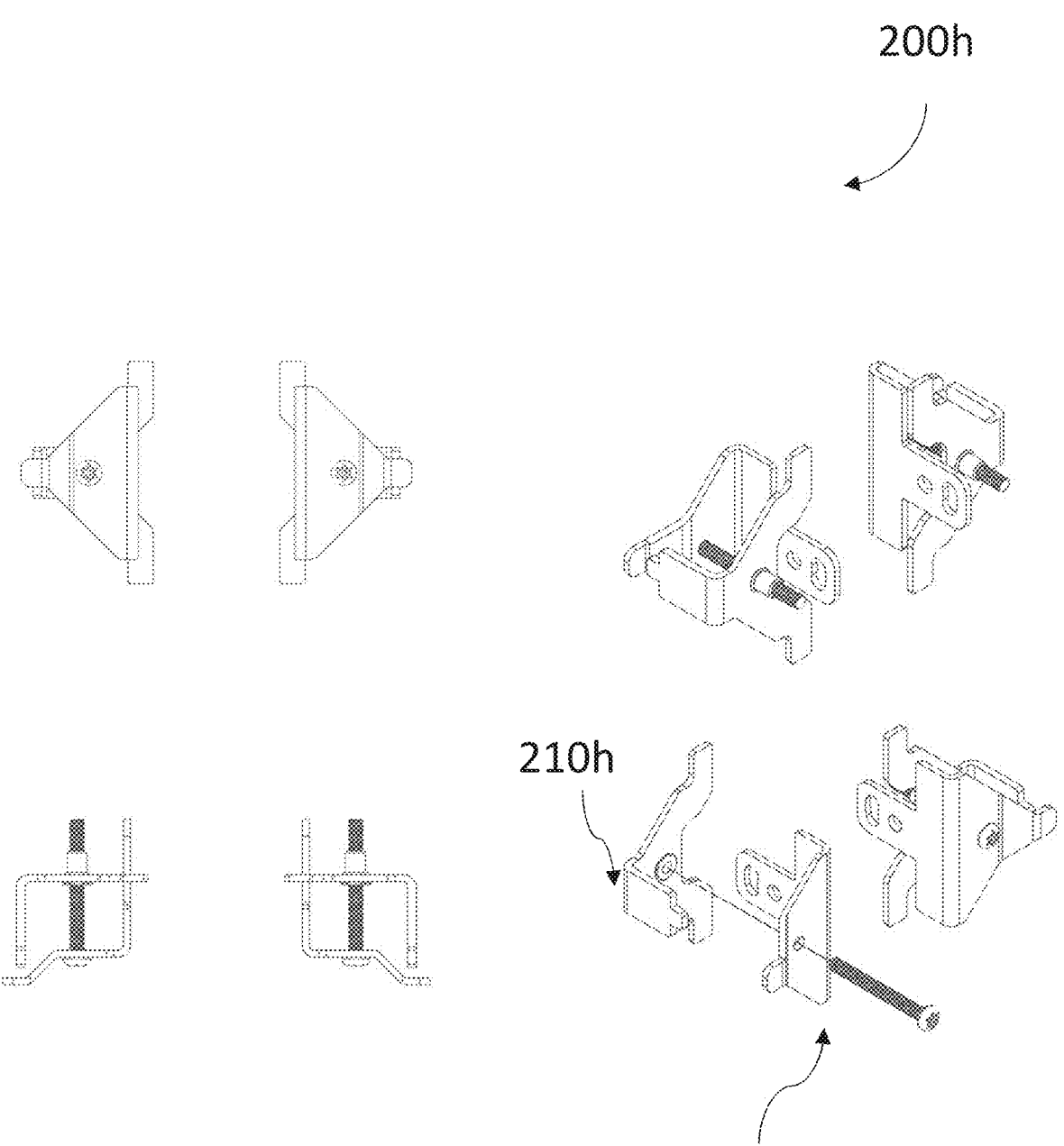
Figure 26:
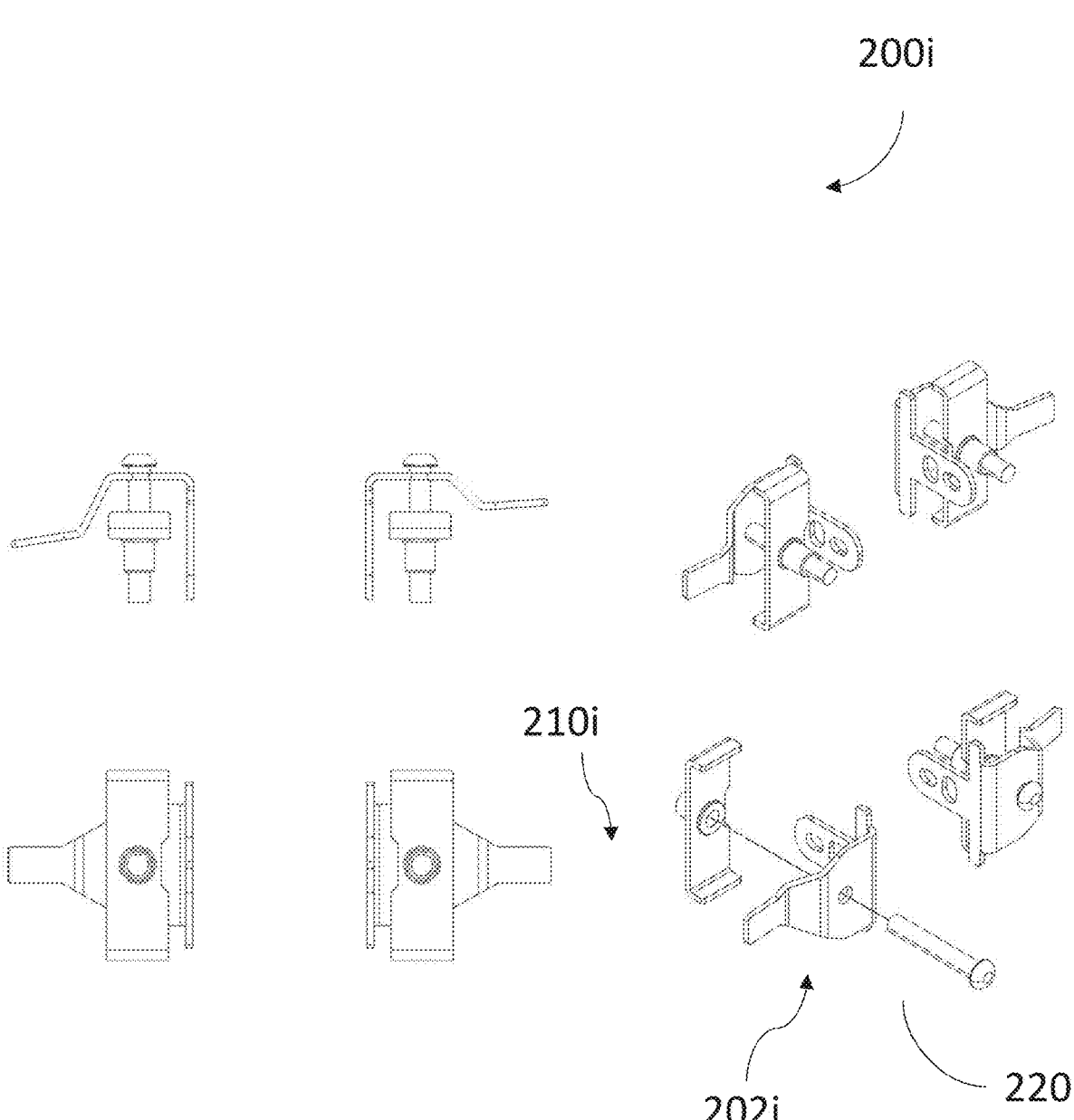
Figure 27:
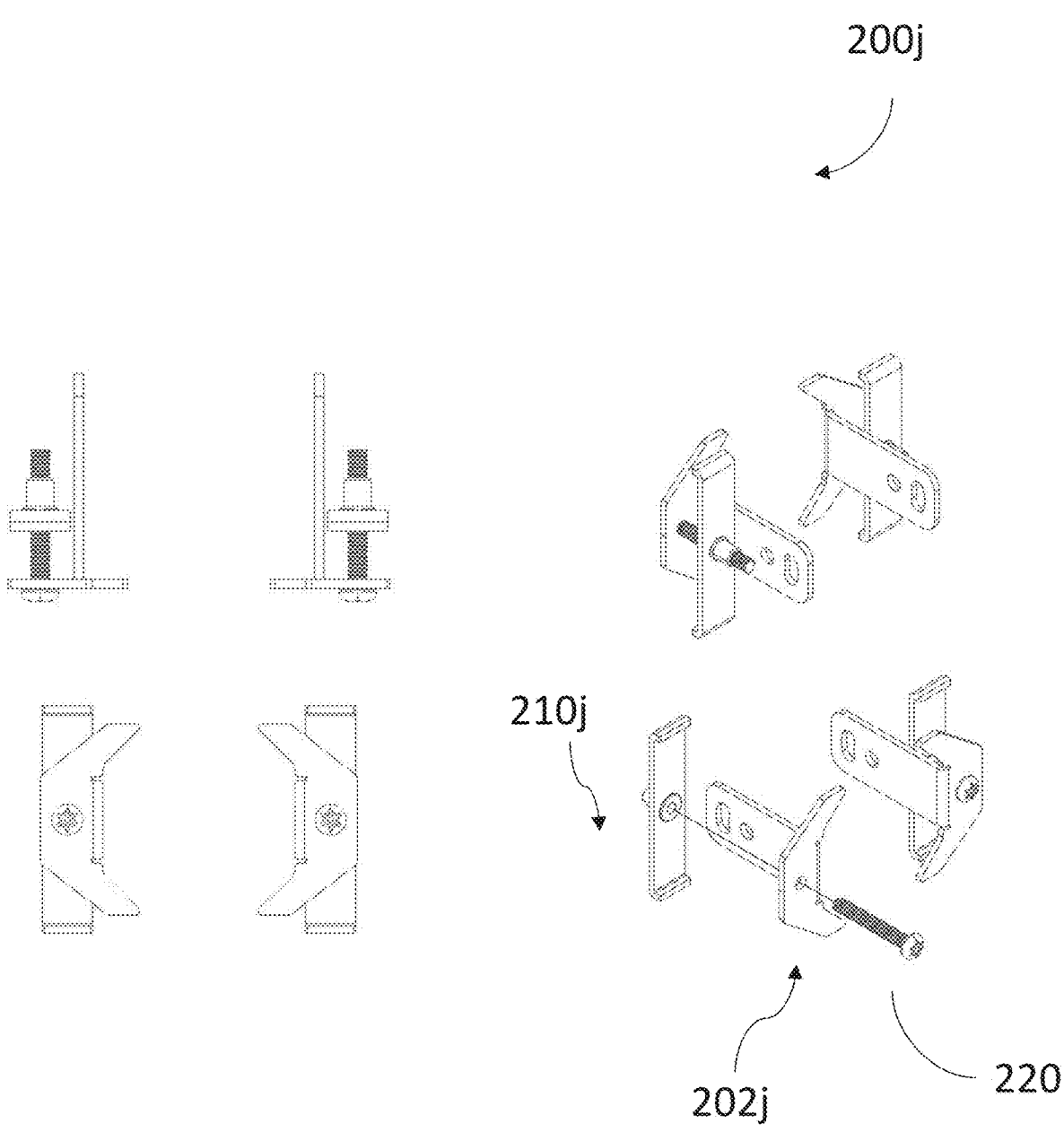
Figure 28:
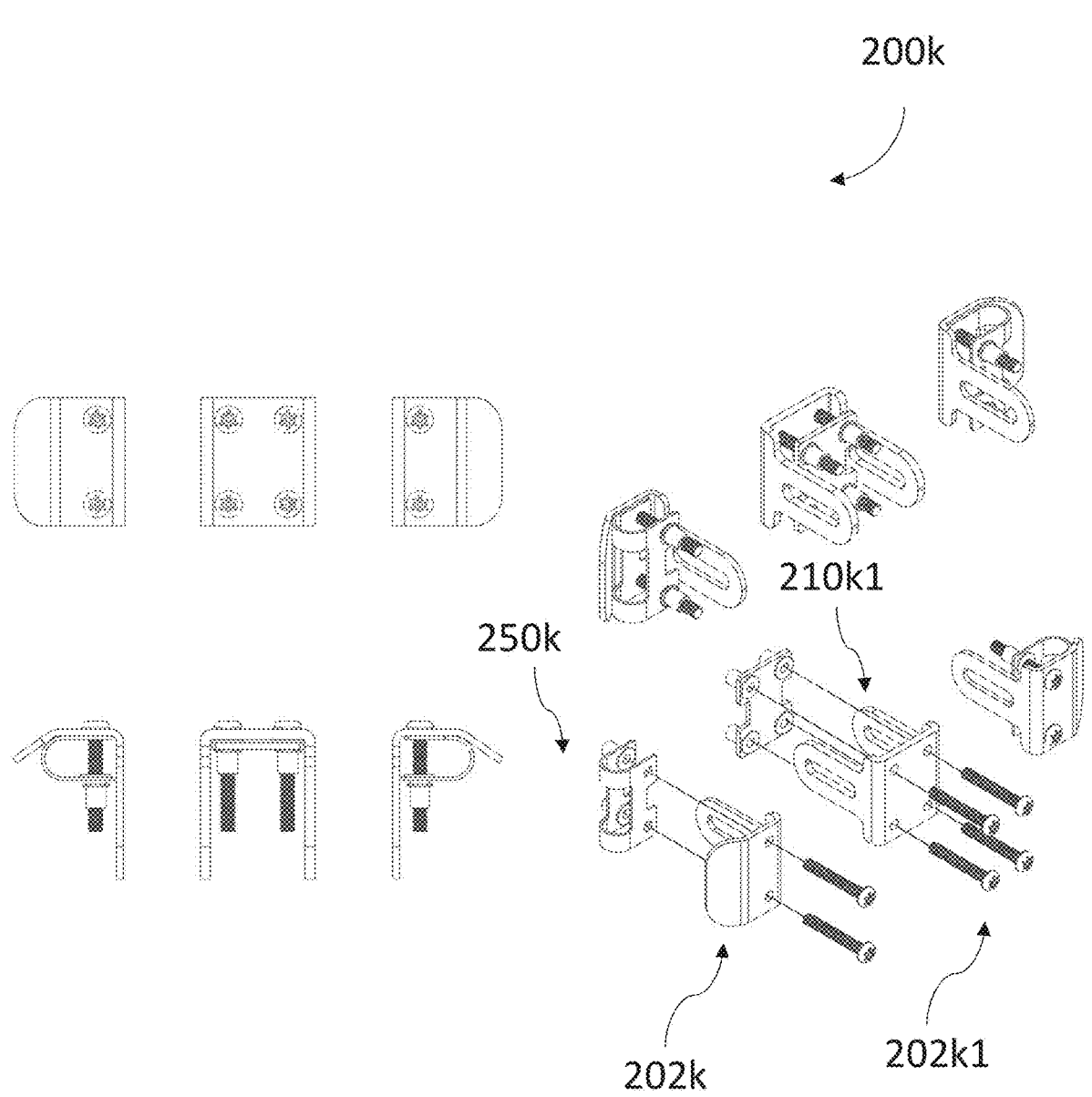

FIGS. 22-28 schematically illustrate mounting kits according to embodiments of the present disclosure. FIG. 22 includes various views of a mounting kit 200*e* according to the present disclosure. FIG. 23 includes various views of a mounting kit 200*f* according to the present disclosure. FIG. 24 includes various views of a mounting kit 200*g* according to the present disclosure. FIG. 25 includes various views of a mounting kit 200*h* according to the present disclosure. FIG. 26 includes various views of a mounting kit 200*i* according to the present disclosure. FIG. 27 includes various views of a mounting kit 200*j* according to the present disclosure. FIG. 28 includes various views of a mounting kit 200*k* according to the present disclosure. The mounting kits 200*e*, 200*f*, 200*g*, 200*h*, 200*i*, 200*j*, 200*k* are similar to the mounting kit 200*c* with various modifications in design features. The mounting kit 200*k* further includes a joint top plate 202*k*2 and a joint back plate 210*k*2. The joint top plate 202*k*2 and joint back plate 210*k*2 may be connect between two vehicle lights, allowing two or more vehicle lights to be installed in one large opening.

Figure 29:
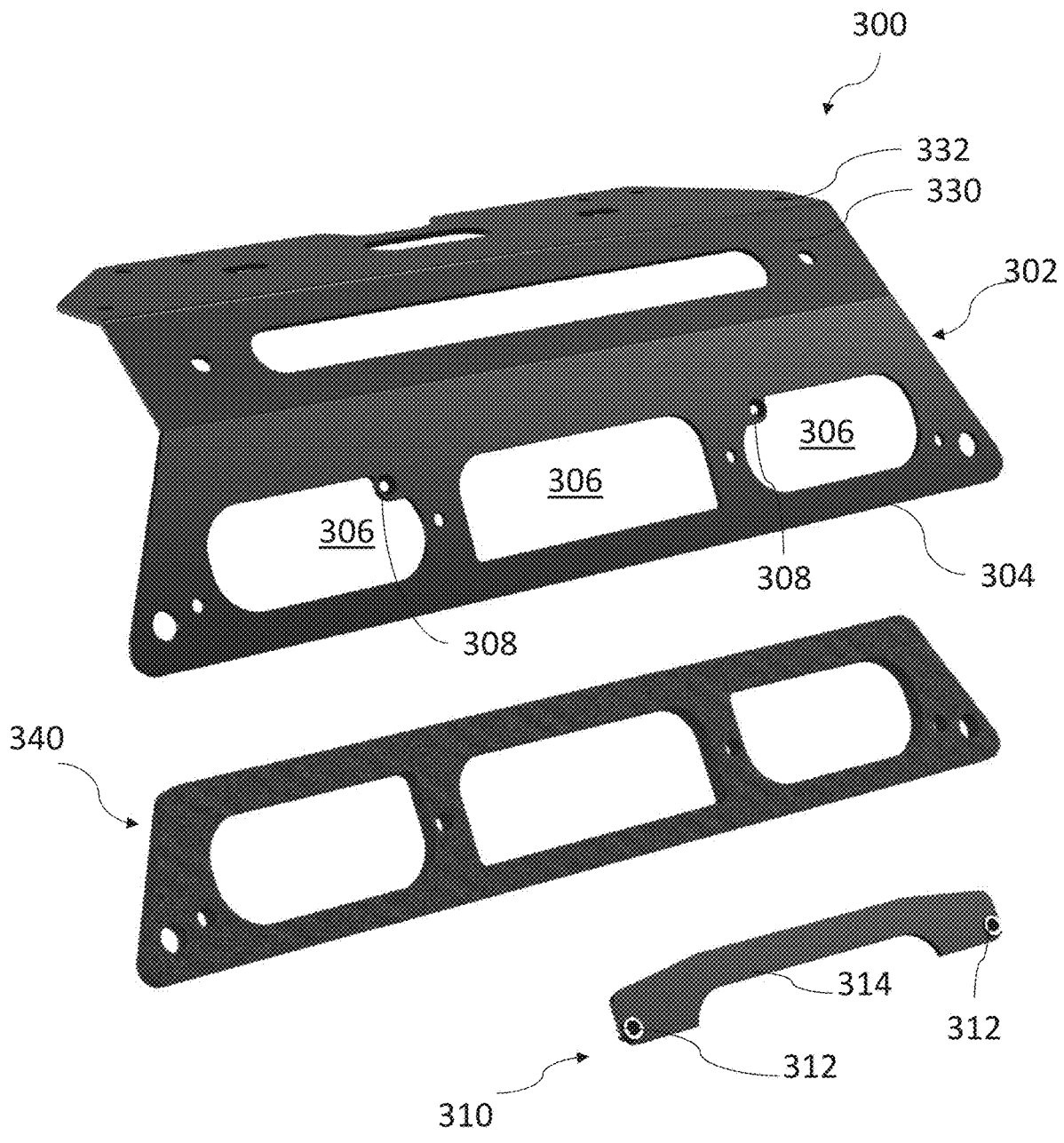
FIGS. 29-33 and 34A-34C schematically illustrate various vehicle mounting kits for roof lights according embodiments the present disclosure.

FIGS. 29-34 schematically illustrate various vehicle mounting kits for mounting vehicle lights on a roof top of the vehicle. FIG. 29 schematically illustrates a mounting kit 300 according to the present disclosure. The mounting kit 300 may be used to attach a vehicle light on a roof top.

Particularly, the mounting kit 300 may be used to install vehicle lights, such as bar lights, on top of a vehicle without drilling holes on vehicle body. The mounting kit 300 may be applied on factory brake lights.

The mounting kit 300 may include a front plate 302 and a back plate 310. The front plate 302 includes a brake light panel 304, a roof light panel 332, and an extension panel 330 connected between the brake light panel 304 and the roof light panel 332. The brake light panel 304 may be substantially planar and configured to mount over factory brake lights. The brake light panel 304 may include light openings 306 configured to expose factory brake lights or install after-market brake lights.

In some embodiments, the brake light panel 304 may include two fastener openings 308 to receiving one or more fasteners, such as screws, there through. The one or more fastener openings 308 are configured to receive screws to fasten with one or more back plates 310.

When the front plate 302 is installed over the brake light, the roof light panel 332 is disposed over the roof. The roof light panel 332 may include various features to install vehicle lights thereon.

The back plate 310 may be include an elongated body 314 having two fastener openings 312 on end portions of the elongated body 314. The fastener openings 312 may be placed at a distance to match with the fastener openings 308 on the front plate 302.

In some embodiments, the mounting kit 300 may include a brake light padding panel 340 configured to dispose between the brake light panel 304 and the vehicle to protect the paint of the vehicle.

Figure 30:
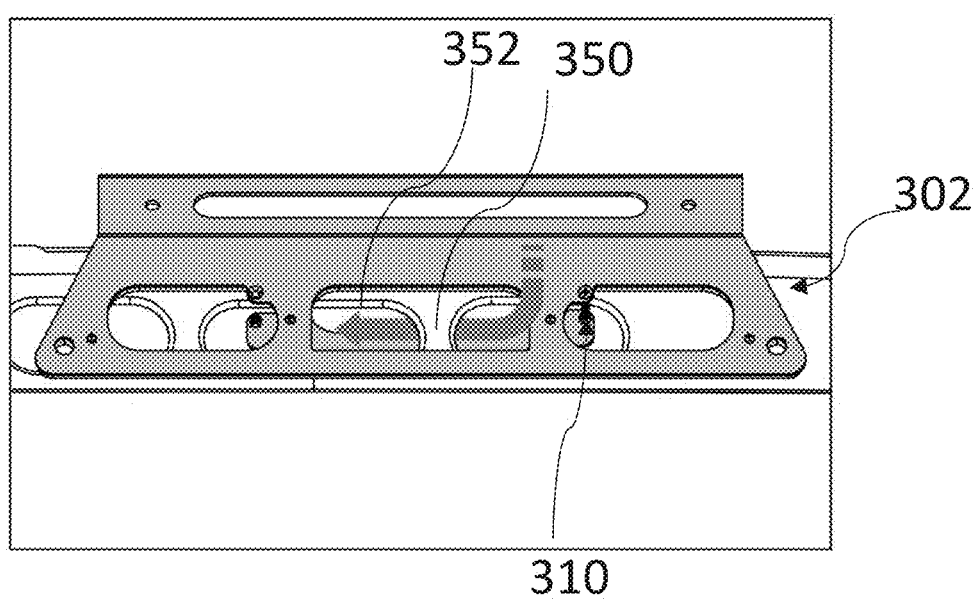
Figure 30:
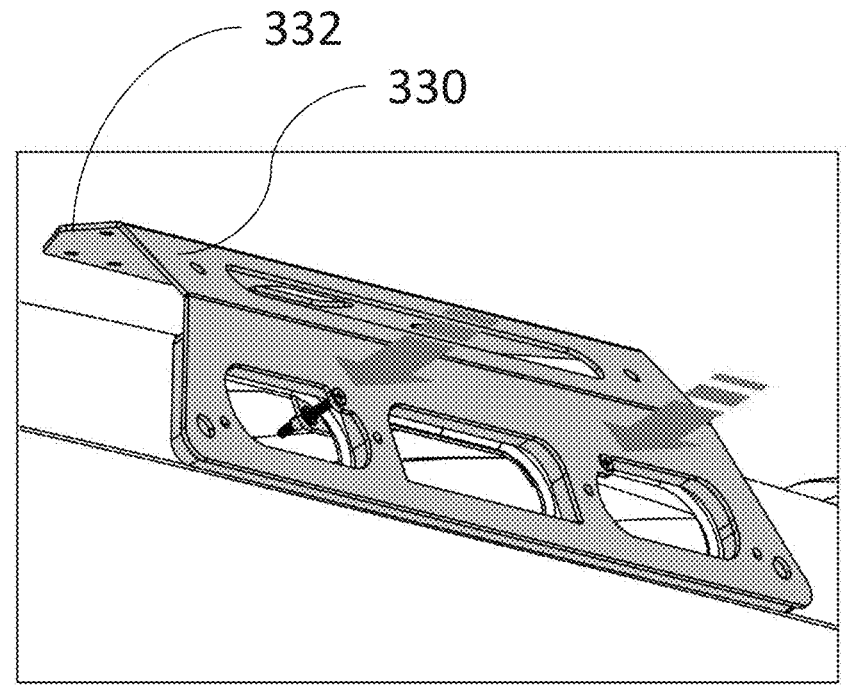

FIG. 30 illustrates a process of installing the mounting kit 300 over a brake light of a vehicle. The process includes removing the factory third brake light by removing the factory screws to expose vehicle body 350 and brake light openings 352, inserting the back plate 310 behind the vehicle body 350, positioning the back plate 310 to expose the fastener opening 312 through the brake light openings 352, coupling the front plate 302 and the back plate 310 using screws through the fastener openings 312 and 308, mounting a roof light bar on the roof light panel 332, and replace the factory brake light.

Figure 31:
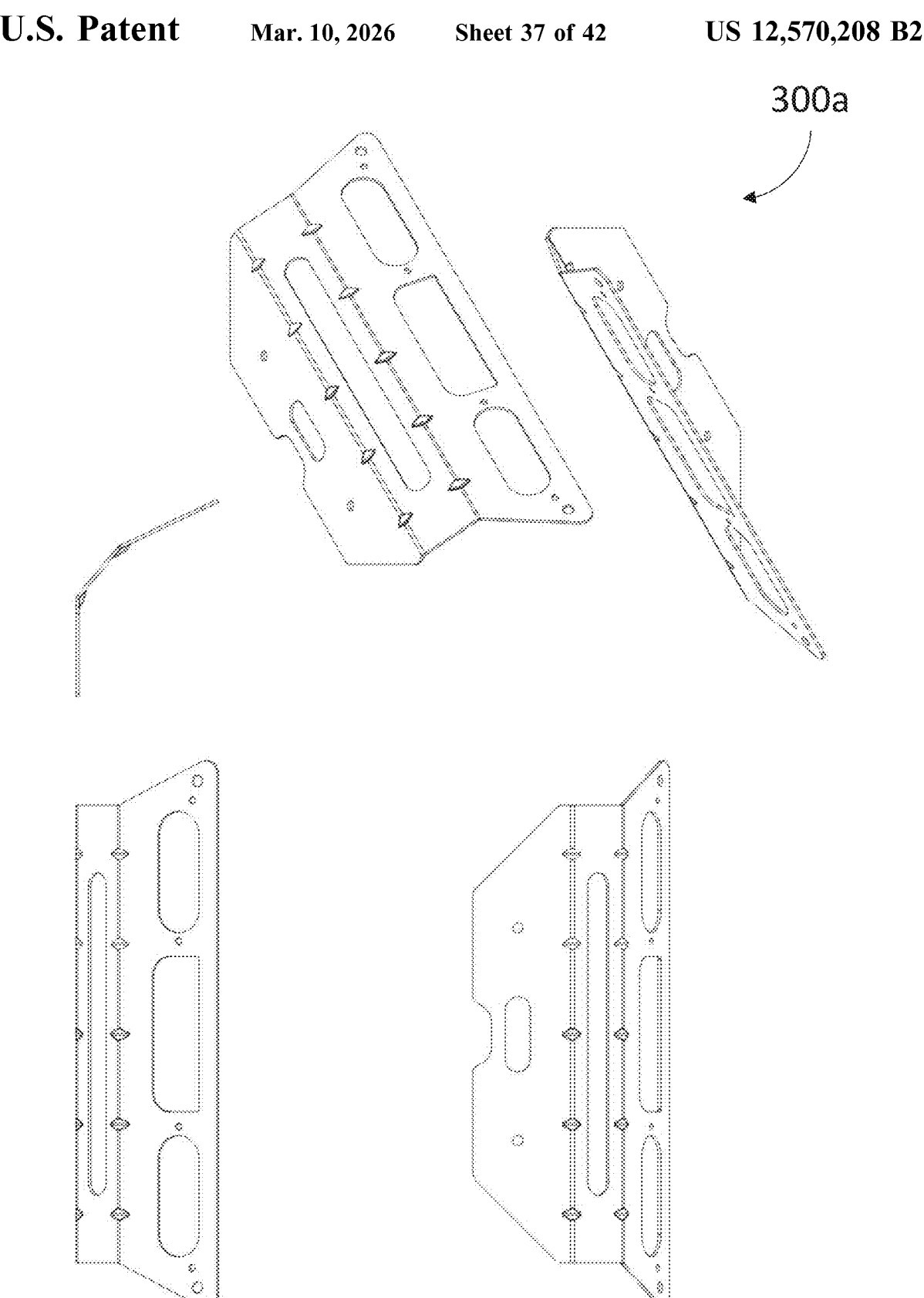
Figure 32:
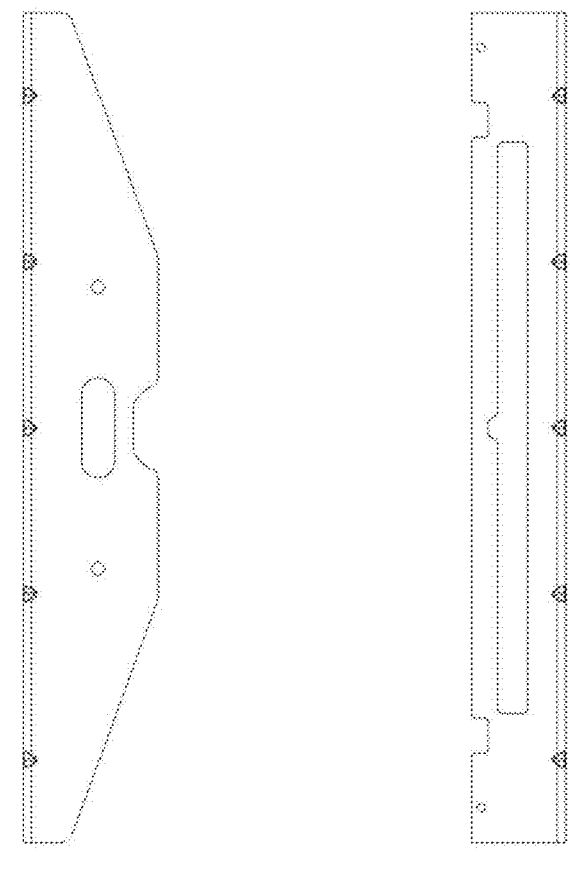
Figure 32:
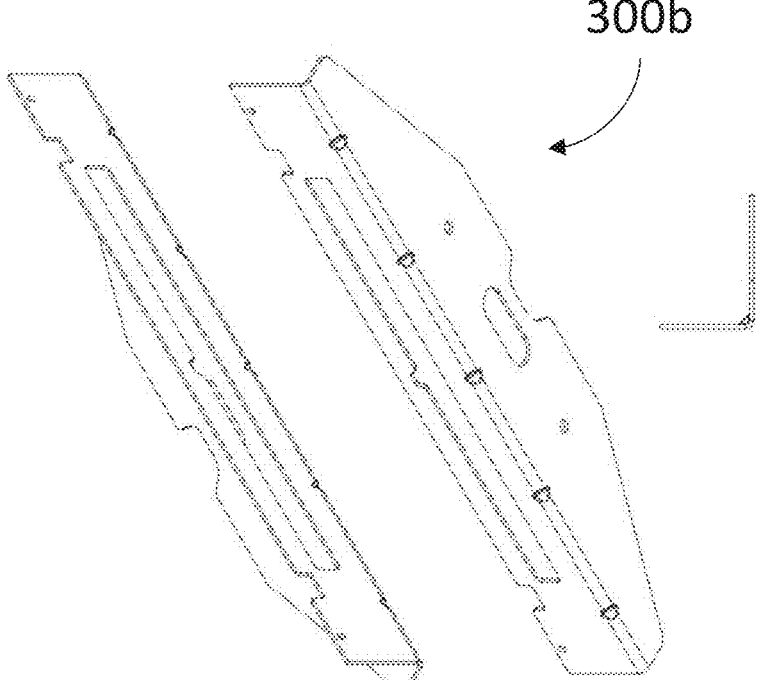
Figure 33:
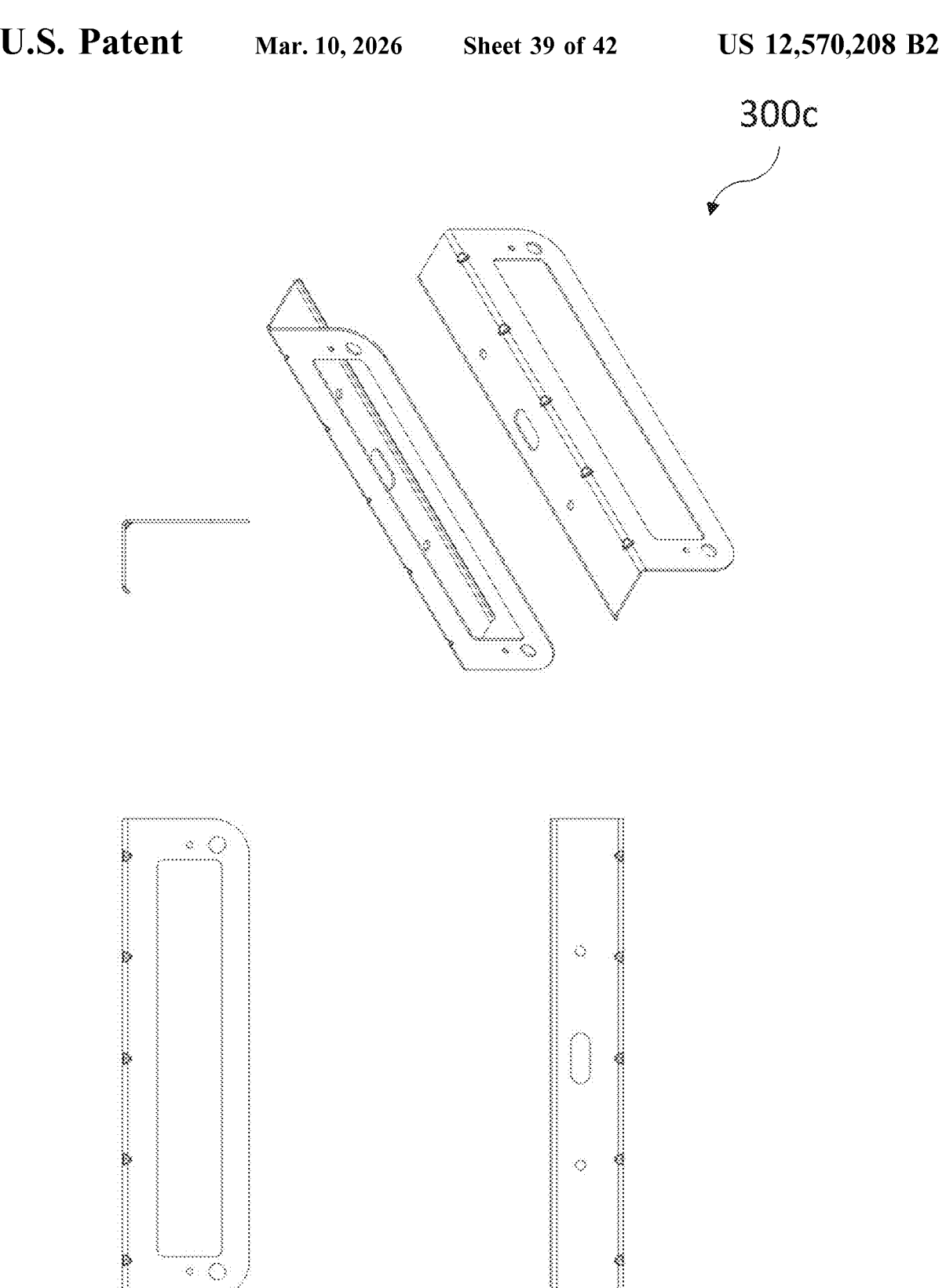
Figure 34A:
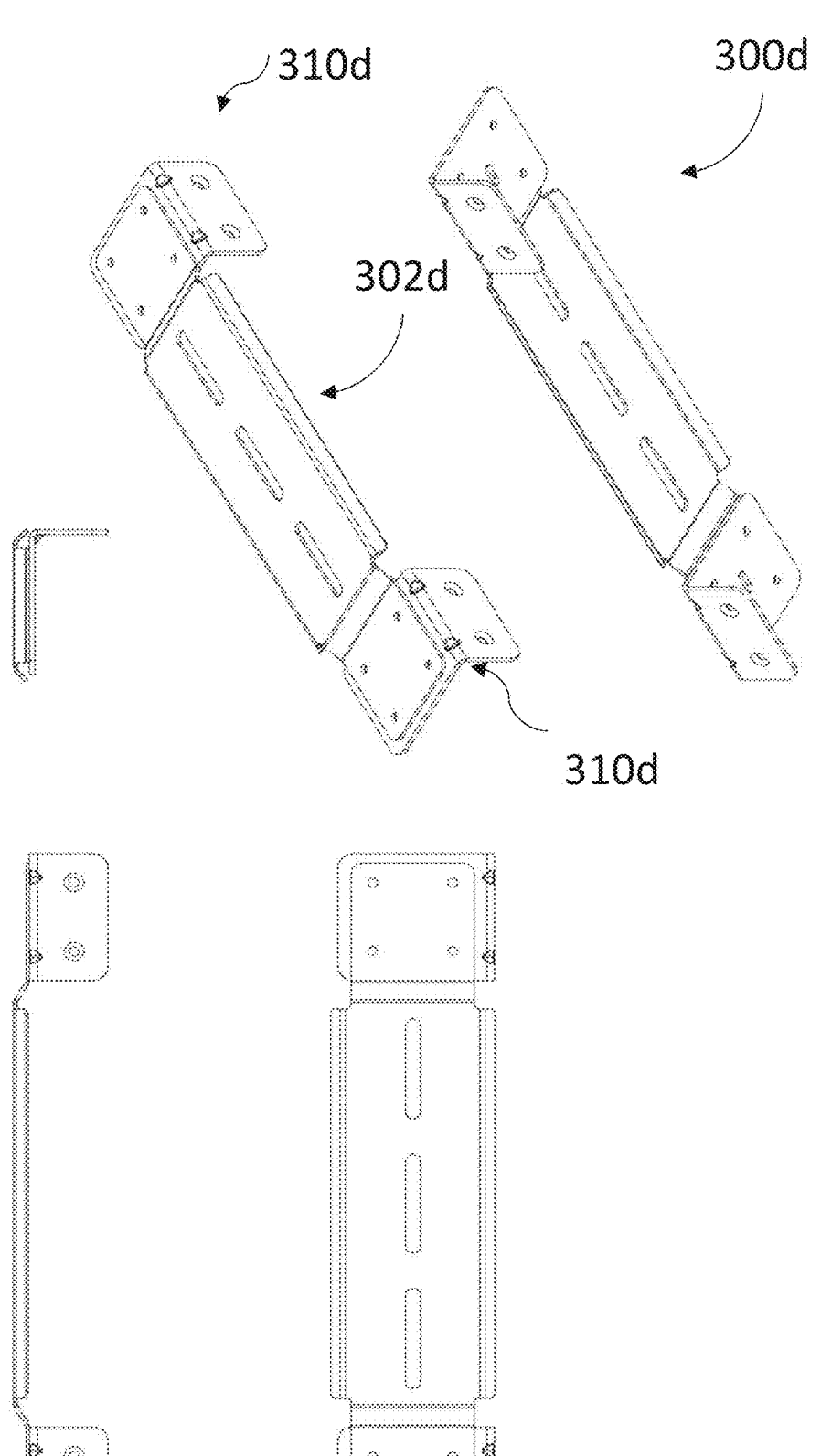
Figure 34B:
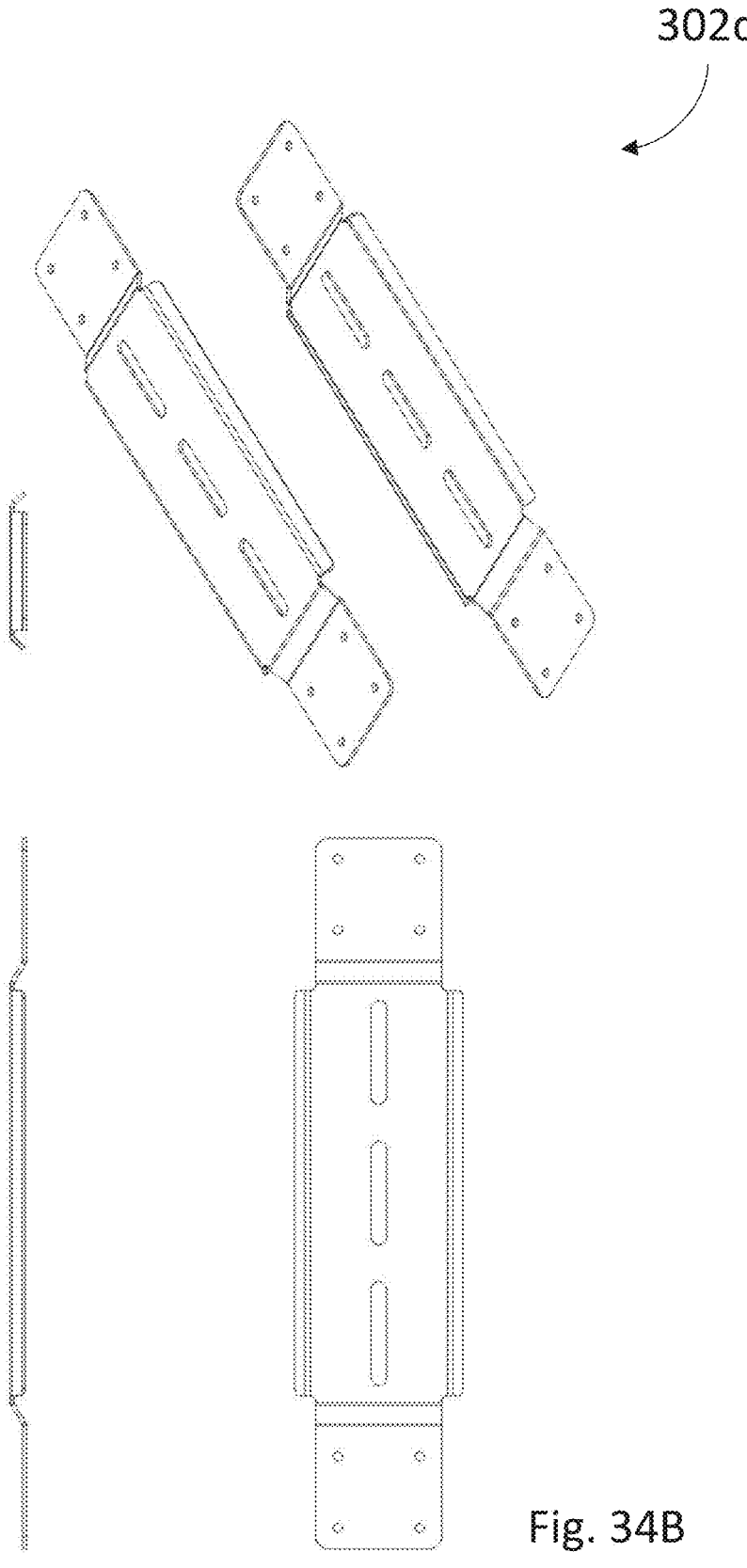
Figure 34C:
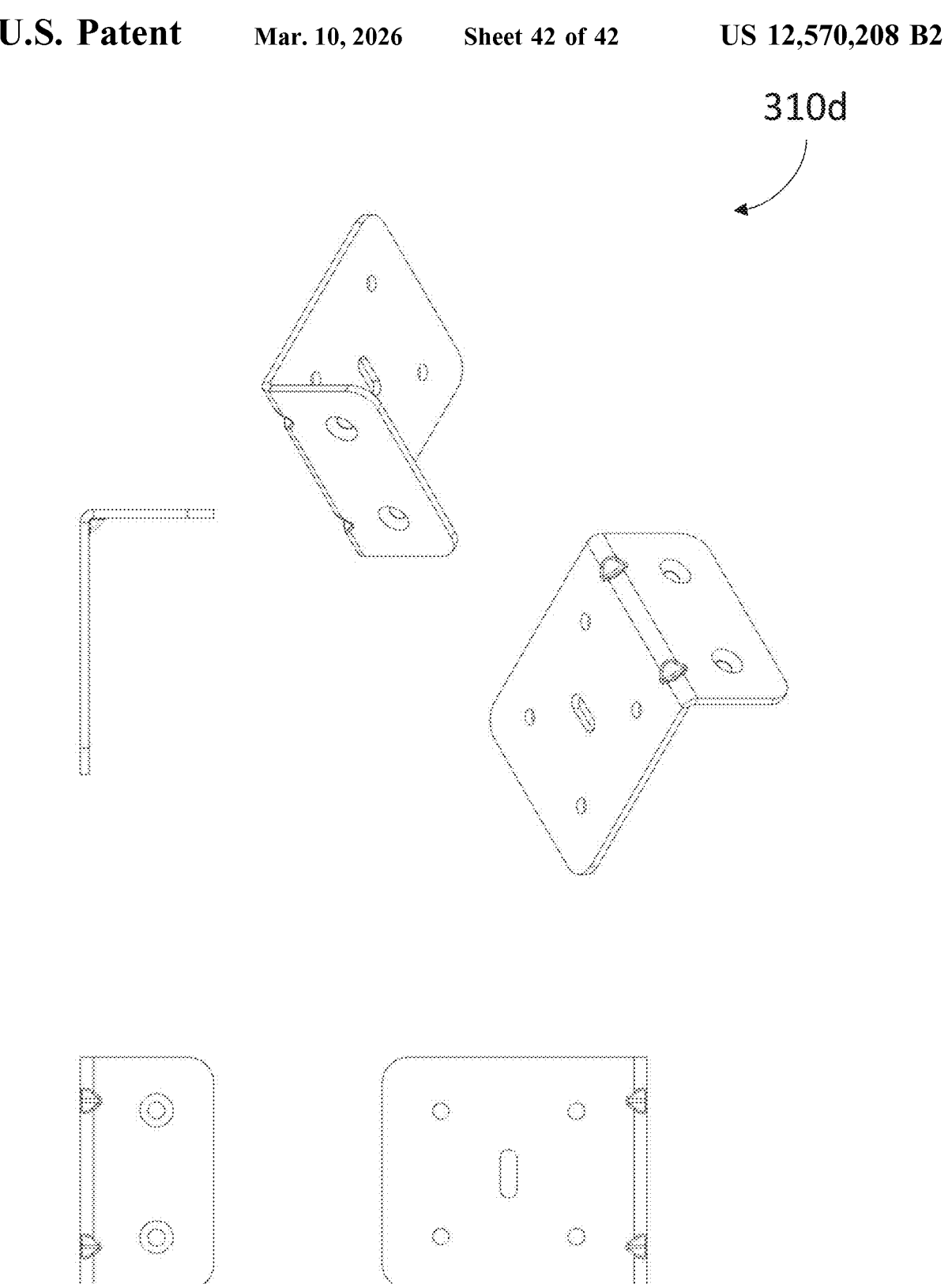

FIGS. 31-34 schematically illustrate roof light mounting kits according to embodiments of the present disclosure. FIG. 31 includes various views of a mounting kit 300*a* according to the present disclosure. FIG. 32 includes various views of a mounting kit 300*b* according to the present disclosure. FIG. 33 includes various views of a mounting kit 300*c* according to the present disclosure. FIG. 25 includes various views of a mounting kit 200*h* according to the present disclosure. FIGS. 34A-34C include various views of a mounting kit 300*d* according to the present disclosure. The mounting kits 300*a*, 300*b*, 300*c*, 300*d* are similar to the mounting kit 300 with various design variations.

Embodiments of the present disclosure relate to vehicle light mounting kits for installing a vehicle light without modifying the vehicle body. The mounting kit may include a front plate and one or more back members. The front plate may have a vehicle-specific profile, thereby, providing a vehicle-specific mounting solution for installers to effortlessly attach auxiliary vehicle lights, such as strobe lights, drive lights, signal lights, and work lights, without cutting or drilling into the vehicle body. Embodiments also provide a method of installing lights on a vehicle grille without grille removal, significantly cutting installation time and the risk of damaging factory parts. The mounting kit and drill-free solution according to the present disclosure ensure easy auxiliary light removal or replacement without causing damage. With no cutting or splicing required, the mounting kit reduces labor costs by up to 75%, allowing easy replacement of damaged lights and minimizing downtime.

Some embodiments provide a vehicle light mounting kit, comprising a front plate for receiving a vehicle light, wherein an outer profile of the front plate is shaped to match an opening of a vehicle grille, wherein the front plate has a first fastener opening and a second fastener opening, a first back member and a second back member, wherein each of the first and second back member includes a threaded opening; and a first fastener and a second fastener, wherein the first and second fasteners are configured to insert through the first and second fastener openings of the front plate and to mate with the threaded openings of the first and second back members.

Some embodiments provide a vehicle light mounting kit, comprising: a front plate comprising: a brake light panel shaped to expose a central brake light, wherein the brake light panel includes two fastener openings; and a roof light mounting panel connected to the brake light panel, wherein the roof light mounting panel and the brake light panel form an angle; and a back plate having an elongated body, wherein the back plate includes two threaded openings, and the two threaded openings match the two fastener openings.

Some embodiments provide a method for installing a vehicle light, comprising: inserting a back member from an exterior side of a vehicle component through a vehicle opening to an interior side of the vehicle component, wherein the back member comprises a threaded opening; positioning the back member to in contact with the vehicle component adjacent the vehicle opening; placing a front plate over the vehicle opening, wherein an outer profile of the front plate is shaped to match the vehicle opening, wherein the front plate includes one or more fastener openings; inserting a fastener through one of the fastener openings of the front plate to the threaded opening of the back member; and tightening the fastener to secure the front plate and the back member to the vehicle component.

While the foregoing is directed to embodiments of the present disclosure, other and further embodiments of the disclosure may be devised without departing from the basic scope thereof.

The invention claimed is:

1. A vehicle light mounting kit, comprising:
a front plate for receiving a vehicle light, wherein an outer profile of the front plate is shaped to match an opening formed through a grille mesh of a vehicle grille, wherein the front plate has a first fastener opening and a second fastener opening;
a first back member and a second back member, wherein each of the first and second back member includes a threaded opening; and
a first fastener and a second fastener, wherein the first and second fasteners are configured to insert through the first and second fastener openings of the front plate and to mate with the threaded openings of the first and second back members.

2. The vehicle light mounting kit of claim 1, wherein each of the first and second back members further comprises a threaded insert disposed in an opening in a planar member, and the threaded opening is formed in the threaded insert.

3. The vehicle light mounting kit of claim 1, wherein the first back member comprises:
a center panel having the threaded opening;
two end panels; and two shoulder panels connecting between the center panel and the two end panels, wherein the center panel protrudes over the end panels, the end panels are substantially planar, and the shoulder panels are sloped.

4. The vehicle light mounting kit of claim 1, wherein the first back member comprises:
a back panel having the threaded opening;
a front panel parallel to the back panel, wherein the front panel has a notch align with the threaded opening; and
a curved panel connecting between the back panel and the front panel.

5. The vehicle light mounting kit of claim 1, wherein the front plate comprises:
a panel body having a light opening configured to receive a vehicle light therein.

6. The vehicle light mounting kit of claim 5, wherein the front plate further comprises:
a first light mounting plate extending from the panel body; and
a second light mounting plate extending from the panel body, wherein the first and second light mounting plates are disposed on opposing side of the light opening.

7. The vehicle light mounting kit of claim 5, wherein the front plate further comprises:
an alignment tab disposed between the first and second fastener openings.

8. The vehicle light mounting kit of claim 5, wherein the panel body has a profile matching an opening in a vehicle grille.

9. The vehicle light mounting kit of claim 5, further comprising:
a first mounting bracket disposed between the first back member and the panel body; and
a second mounting bracket disposed between the second back member and the panel body, wherein the first and second mounting brackets include mounting openings to receive a vehicle light.

10. The vehicle light mounting kit of claim 1, wherein the first and second fasteners are anti-theft hex screw.

11. A method for installing a vehicle light, comprising:
inserting a back member from an exterior side of a vehicle grille through an opening formed through a grille mesh of the vehicle grill to an interior side of the vehicle grille, wherein the back member comprises a threaded opening, a first fastener and a second fastener;
positioning the back member to in contact with the grille mesh adjacent the grille opening;
placing a front plate over the grille opening, wherein an outer profile of the front plate is shaped to match the grille opening, wherein the front plate includes one or more fastener opening;
inserting a fastener through one of the fastener openings of the front plate to the threaded opening of the back member; and
tightening the fastener to secure the front plate and the back member to the vehicle grille.

12. The method of claim 11, further comprising securing a vehicle light to the front plate.

13. The method of claim 12, wherein securing the vehicle light comprising inserting the fastener through a mounting opening of the vehicle light.

14. The method of claim 12, wherein securing the vehicle light comprising mounting the vehicle light to the front plate.

15. The method of claim 12, wherein securing the vehicle light comprising mounting the vehicle light to a light mounting plate.

16. The method of claim 11, wherein the vehicle component is a vehicle grille.

17. A vehicle light mounting kit, comprising:

a front plate for receiving a vehicle light, wherein an outer profile of the front plate is shaped to match an opening formed through a grille mesh of a vehicle grille, wherein the front plate has a first fastener opening, a second fastener opening, and a light opening disposed between the first and second fastener openings and configured to receive a vehicle light therein; and a first back member and a second back member, wherein the first back member includes a third fastener opening, and the second back member includes a fourth fastener opening.

18. The vehicle light mounting kit of claim 17, further comprising:

a first fastener and a second fastener, wherein the first and second fasteners are configured to secure the first and second back members to the front plate on opposite side of the vehicle grille.

19. The vehicle light mounting kit of claim 18, wherein the third fastener opening and the fourth fastener opening are threaded openings configured to mate with the first and second fasteners.

20. The vehicle light mounting kit of claim 17, wherein the first back member comprises:

a center panel having the third fastener opening;

two end panels; and two shoulder panels connecting between the center panel and the two end panels, wherein the center panel protrudes over the end panels, the end panels are substantially planar, and the shoulder panels are sloped.

\*    \*    \*    \*    \*